(12) United States Patent
Abdollah-shamshir-saz

(10) Patent No.: US 11,771,997 B2
(45) Date of Patent: Oct. 3, 2023

(54) METHOD OF AND SYSTEM FOR PREVENTING WALL HACKING IN VIDEO GAMES BY USING RAY TRACING TO FILTER OUTGOING DATA PACKETS

(71) Applicant: TooMuchVoltage Software Inc., Toronto (CA)

(72) Inventor: Baktash Abdollah-shamshir-saz, Toronto (CA)

(73) Assignee: TooMuchVoltage Software Inc., Toronto (CA)

( * ) Notice: Subject to any disclaimer, the term of this patent is extended or adjusted under 35 U.S.C. 154(b) by 109 days.

(21) Appl. No.: 17/572,009

(22) Filed: Jan. 10, 2022

(65) Prior Publication Data
US 2022/0219086 A1     Jul. 14, 2022

Related U.S. Application Data

(60) Provisional application No. 63/151,289, filed on Feb. 19, 2021, provisional application No. 63/135,354, filed on Jan. 8, 2021.

(51) Int. Cl.
*A63F 13/75*      (2014.01)
*G06T 15/06*      (2011.01)

(52) U.S. Cl.
CPC ............. *A63F 13/75* (2014.09); *G06T 15/06* (2013.01); *A63F 2300/5533* (2013.01); *A63F 2300/5586* (2013.01)

(58) Field of Classification Search
CPC .............. A63F 13/75; A63F 2300/5533; A63F 2300/5586; G06T 15/06
See application file for complete search history.

(56) References Cited

U.S. PATENT DOCUMENTS

| | | |
|---|---|---|
| 2006/0247038 A1 | 11/2006 | Bamberger et al. |
| 2015/0194016 A1 | 7/2015 | Arnone et al. |
| 2018/0182208 A1 | 6/2018 | Liu et al. |
| 2020/0206635 A1 | 7/2020 | Mojarad et al. |
| 2021/0232907 A1* | 7/2021 | Pardeshi ................. G06N 3/08 |
| 2022/0126210 A1* | 4/2022 | Kumar .................. G06T 15/005 |

OTHER PUBLICATIONS

Granados, N., "Report: Cheating Is Becoming a Big Problem in Online Gaming," Forbes (Apr. 20, 2018).
(Continued)

*Primary Examiner* — Reginald A Renwick
(74) *Attorney, Agent, or Firm* — Harness, Dickey & Pierce, PLC

(57) ABSTRACT

There is provided a method and a system for preventing wall-hacking by using server side ray tracing to filter data packets to be provided to user devices during a multiplayer video gaming session. Map information and player updates indicative of player actions are received, and an acceleration structure is generated. Primary rays from the virtual frustum associated with players are generated and intersections between rays and players geometries on the map are determined based on the acceleration structure. The visibility matrix is generated based on the determined intersections. The visibility matrix includes pair wise visibility information between each player. Data packets provided to each user device are then filtered based on the visibility matrix.

20 Claims, 25 Drawing Sheets

(56) References Cited

OTHER PUBLICATIONS

Warren, T., "The World's Biggest PC Games Are Fighting a New Surge of Cheaters and Hackers," The Verge (May 6, 2020).
Irdeto, "The business impact of video game cheaters and pirates-and how to fight back" BrightTALK (Jun. 29, 2021).
Copeland, W., "CS:GO eSports Community Shaken Following Revelation of Cheating" IGN (Nov. 25, 2014).
Flashpoint, "$1 Million on the Line for Flashpoint 2 and the Largest CS:GO Prize Pool of 2020" PR Newswire (Oct. 22, 2020).
Esportz Network, "CS:GO Esports Reaches $100 Million Milestone for Prizes" (Aug. 28, 2020).
Ward, M., "Warcraft game maker in spying row" BBC News (Oct. 31, 2005).
Park, S., "BlackMirror: Preventing Wallhacks in 3D Online FPS Games" Life as a Geek (Nov. 9-13, 2020).
Wikipedia, "Software Guard Extensions" (published earlier than Jan. 10, 2022).
Burke, B., "Arm Is RTX ON! World's Most Widely Used CPU Architecture Meets Real-Time Ray Tracing, DLSS" (Jul. 19, 2021).
I3D.net "FairFight Anti-Cheat Software" (published earlier than Jan. 10, 2022).
GDconf, "At GDC 2018, See How Valve Uses Deep Learning to Fight Cheating in CS:GO!" (Jan. 29, 2018).
Hwang, J. "Beating Wallhacks using Deep Learning with Limited Resources" (2019).

\* cited by examiner

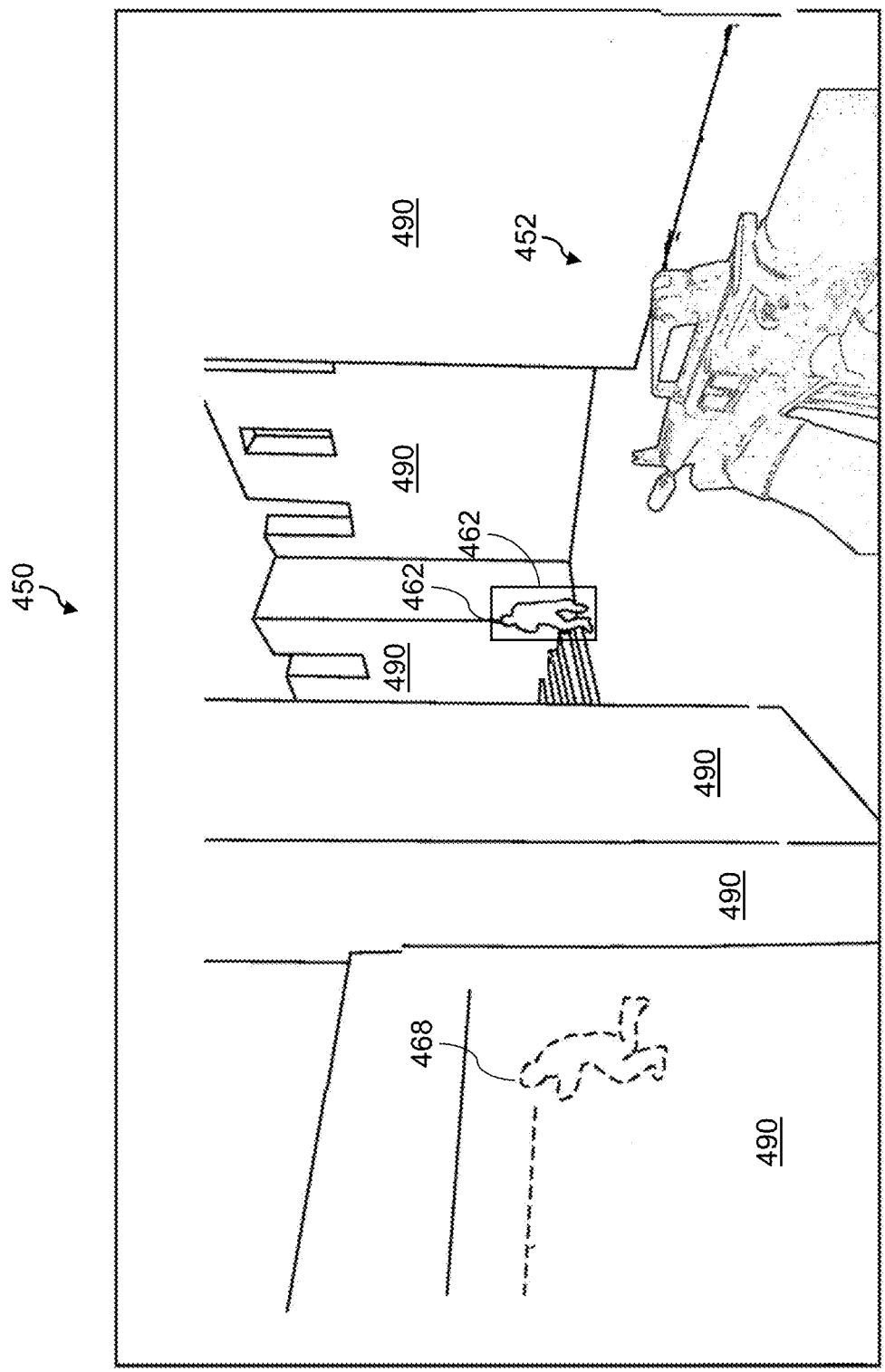

METHOD OF AND SYSTEM FOR PREVENTING WALL HACKING IN VIDEO GAMES BY USING RAY TRACING TO FILTER OUTGOING DATA PACKETS

CROSS-REFERENCE TO RELATED APPLICATIONS

The present application claims priority to U.S. Provisional Patent Application Ser. No. 63/135,354 filed on Jan. 8, 2021 and to U.S. Provisional Patent Application Ser. No. 63/151,289 filed on Feb. 19, 2021, the content of which is hereby incorporated by reference in its entirety.

FIELD

The present technology relates to video games in general and more specifically to methods and systems for preventing wall hacking in video games by using ray tracing to filter outgoing data packets.

BACKGROUND

Online gaming has become more and more popular as wide area network access across the world has become more available. Online game players may interact within both social and competitive environments. Over time, players may gain status among a gaming community by meeting defined goals, such as by earning achievements, in various games.

Cheating in video games is one of the most problematic issues facing video game developers and publishers alike. A survey by Irdeto revealed a staggering 37% of respondents admitting to cheating. It further revealed that 76% of respondents stressed the importance of preventing cheating in online games. CEO of Irdeto further stressed that not countering these issues will lead to lower engagement and shrinking revenues which is a commonly reported phenomenon. In a webinar hosted by GamesBeat, Riot Games revealed that cheaters roughly cause 33% of affected players to discontinue playing an online game.

One popular form of cheating in video games such as first person shooters (FPS) that is difficult to detect is wallhacking, which enables a player to cheat by modifying the properties of walls, as by making them transparent or nonsolid. Some types of wallhacks may draw armatures or boxes around enemies on screen instead.

The reason wallhacks are difficult to detect are their very nature: the player, while knowing where enemy combatants are, may intentionally not look their way to deceive spectators observing gameplay. This provides for incredible difficulty in definitively proving whether the observed player was indeed engaging in cheating. Such inquires themselves result in paranoia amongst other players and reduce trust in the fairness of the game itself.

This especially becomes a problem in the world of e-Sports where large prize pools are at stake and fairness is incredibly important. A notable scandal is that of the 2014 banning of professional competitors Hovik Tovmassian (Team Titan), Simon Beck (Team Alternate) and Gordon Giry (Team Epsilon) which made headlines. They were caught and banned mere days before the Dreamhack Winter 2014 CS:GO championship tournament where a prize pool of $250,000 was at stake. It is important to note that this prize pool is by no means the largest of such pools as there are competitions with much larger prize pools such as the $1 M at stake for B Site Inc.'s Flashpoint 2 championships. Prize pools for CS:GO alone have totalled more than $100 M in a breakdown provided by Valve Corporation.

SUMMARY

It is an object of the present technology to ameliorate at least some of the inconveniences present in the prior art. One or more embodiments of the present technology may provide and/or broaden the scope of approaches to and/or methods of achieving the aims and objects of the present technology.

The developer of the present technology has appreciated that many attempts have been made in the past to eliminate or detect not just wall-hacking but other forms of online cheating for first/third person shooter video games.

Most anti-cheat software includes technology that runs on client systems. Notable examples include VAC (Valve Anti-Cheat), PunkBuster™ and BattlEye™. There are two notable issues with this. Firstly, many consumers feel that these technologies are very invasive as they operate at a privileged level to scan client machines for signatures of known cheat applications. In this sense they are comparable to intrusive digital rights management (DRM) software (used by the music and film industries) or intrusive Anti-virus software. This issue of invasiveness is so bothersome that Blizzard's anti-cheat solution was classified as malware by the Electronic Frontier Froundation (EFF) at one point. Secondly, cheat applications can indeed be released with new signatures or equipped with sophisticated techniques that place them below the anti-cheat application at operating system level (along with prior analysis of the host anti-cheat software) and effectively operate as a root-kit. Detection or removal of such technologies at such points becomes either incredibly difficult or virtually impossible. State of the art academic proposals such as BlackMirror released at the ACM Special Interest Group on Security, Audit and Control (SIGSAC) in 2020 propose placing anti-cheat softwareinside Intel's SGX enclave. US Patent Application Publication No. 2020/0206635 to Intel proposes executing anti-cheat code in their Software Guard Extensions (SGX) secure execution environment embedded in their CPUs which cooperates with an anti-cheat server periodically. SGX has been shown to be vulnerable to break-ins via and exclusive to Intel CPUs only. NVIDIA's recent success with running a modern Wolfenstein title on ARM CPUs highlights the necessity for a solution that does not rely on vendor specific guarded execution environments. U.S. Patent Application Publication No. 2006/0247038A1 to Valve involves periodic client challenges also suffers from client-side tampering. The challenges can be run inside virtual execution environments crafted specifically to report false negatives in combination with sophisticated heuristics to differentiate real from fake (i.e. 'no-op') challenges. The patent itself emphasises the fact that its proper operation rests on the client machine not having had enough time to develop countermeasures to challenges provided within server-supplied 'black boxes'. Given the development history of cheating software, this is a never ending struggle for anti-cheat (and more generally DRM) software development. SecureBoot Attestation is slowly gaining popularity as a client-side anti-tamper measure. However, its adoption remains largely voluntary and low as many clients with older hardware have found it difficult to procure the TPM hardware required for its operation.

Some technologies have emerged as solely server-side anti-cheat technology. Notable mentions are that of Fair-Fight™ by GameBlocks, Valve's machine-learning based anti-aimbot solution and Nexon's machine-learning based anti-wallhack solution. GameBlock's technology proposes a statistical approach which tracks player behaviour and compares it to a wide variety of data. The issue with this approach is that there can be false positives as they have been reported by the community at large. This further reduces faith in the system amongst players. It is notable that U.S. Patent Application Publication No. 2018/0182208 to Microsoft and U.S. Patent Application Publication No. 2015/0194 016A1 to Gamblit Gaming's also disclose player tracking to achieve a similar goal: flagging players that advance too quickly in a game.

The developer of the present technology has appreciated that there is a need for a system that is deterministic and simply prevents wall-hacks from happening in the first place. Valve's machine-learning based application solely targets aim-botting. While they allege that it is achieving high accuracy, this approach unfortunately still provides for community frustration as it does not prevent the act but rather addresses it after the fact. Needless to say, it does not address the issue that we address in this document whatsoever.

Nexon's approach is another interesting solution that randomly takes screenshots (pictures) of the player's screen and uploads them to Nexon servers for analysis. While this may work initially, it provides no guarantee that sophisticated root-kit like cheating software won't circumvent the screen-recording mechanism and momentarily turn off wall-hacking when screen-shots are being taken.

One or more embodiments of the present technology may be provided in the form of middleware with an API provided to server-side developers for interfacing with the middleware. The middleware requires a server environment that has a real-time ray tracing-capable graphics processing unit (GPU) or provides real-time ray tracing in some reasonable capacity. The server does not need a display output and one is not required for one or more implementations of the present technology.

Thus, one or more embodiments of the present technology are directed to a method of and a system for preventing wall hacking in video games by using server-side ray tracing.

In accordance with a broad aspect of the present technology, there is provided a method for filtering data packets to prevent wall hacking using ray tracing during a gaming session between a plurality of user devices, each respective user device being associated with a respective player having a respective player geometry in the gaming session, the method being executed by at least one processing device, the method comprising: receiving map information for the gaming session, for a given iteration of a plurality of iterations during the gaming session: receiving player updates indicative of actions of the respective players on the map, the player updates including respective virtual frustum information for each player, generating an acceleration structure using the map information and the player updates, generating, for each player, respective primary rays from the respective virtual frustum associated with the player, determining, for each player, based on the respective primary rays and the acceleration structure, intersections between the respective primary rays and the respective player geometries on the map, generating a visibility matrix based on at least the determined intersections, the visibility matrix comprising pair-wise visibility between the respective players on the map, receiving outgoing data packets representative of player states on the map for the given iteration frame, filtering the outgoing data packets based on the visibility matrix to obtain respective filtered data packets for each player, and transmitting the respective filtered data packets to each of the plurality of user devices.

In one or more embodiments of the method, said method further comprises, prior to said generating, the acceleration structure using the map information and the player updates: receiving current vantage point data, receiving future vantage point data, and generating, for each player, using the current vantage point data and future vantage point data, a collated player geometry associated with the respective player, said generating the acceleration structure comprises further using collated player geometry.

In one or more embodiments of the method, receiving current vantage point data, receiving future vantage point data, and generate, for each of the respective virtual frustum associated with the player, a respective plurality of virtual frusta using the current vantage point data and future vantage point data from which the respective primary rays are launched.

In one or more embodiments of the system, said generating the acceleration structure comprises: generating a plurality of bottom-level acceleration structures based on map geometry instances in the map information and the respective player geometry, and combining the plurality of bottom-level acceleration structures to obtain a top-level acceleration structure to be used for determining intersection between the respective primary rays and the respective player geometries on the map.

In one or more embodiments of the method, receiving a set of force-casters and associated bounding spheres, determining if a given force-caster of the set of force-casters overlaps with a given primary ray, and in response to the given force-caster of the set of force-casters overlapping with the primary ray: launching further primary rays.

In one or more embodiments of the method, said method further comprises, prior to generating said visibility matrix: determining intersections between the respective rays and players on the map, involving a given light source, storing an indication of players having intersected rays having reached the given light source in association with the respective player having launched the primary ray that generated the respective rays, and said generating the visibility matrix comprises using the stored indications of players.

In one or more embodiments of the method, the method further comprises, prior to said generating the visibility matrix: receiving a respective ping associated with each player, in response to the ping associated with at least one given player being above a predetermined threshold: determining respective origins for each of a plurality of virtual sub-frusta obtained for the respective virtual frustum for each respective player, clipping the respective origins against the map, determining respective threshold distances from a center of a geometry of each respective player, the respective threshold distances being proportional to the geometry of the respective player, generating, based on the respective threshold distances, at least one bottom level acceleration structure for each respective player, and generating, using the bottom level acceleration structures, a top level acceleration structure for the at least one given player, the top level acceleration structure to be used for determining intersecting primary rays of the at least one given player originating from at least the respective clipped origins.

In one or more embodiments of the method, said player geometries comprise player armatures, said generating, for each player, respective primary rays from the respective virtual frustum associated with the player comprises: determining respective difference vectors between each originating player and a centroid of each remaining player armature, determining if lengths of the respective difference vectors are above a predetermined threshold, the predetermined threshold being based on the respective player armature, determining, for the respective difference vector lengths with lengths above the threshold, an angle based on the respective difference vectors and the respective primary rays, and in response to the angle being below a threshold, redirect the primary rays towards the player armatures to be used for determining further intersections for generating the visibility matrix.

In one or more embodiments of the method, said player geometries comprise bounding boxes, and said generating, for each player, respective primary rays from the respective virtual frustum associated with the player comprises: determining respective difference vectors between each originating player and a centroid of each remaining player bounding box, determining if lengths of the respective difference vectors are above a predetermined threshold, the predetermined threshold being based on respective the bounding box, determining, for respective difference vectors with lengths above the threshold, an angle based on the respective difference vectors and the respective primary rays, and in response to the angle being below a threshold, launch further primary rays to be used for determining further intersections for generating the visibility matrix.

In accordance with a broad aspect of the present technology, there is provided a method for determining pair-wise visibility between players during a video game session by using ray-tracing, each player having a respective player geometry, the method being executed by at least one processing device, the method comprising: receiving map information for the gaming session, for a given iteration of a plurality of iterations during the gaming session: receiving player updates indicative of actions of the respective players on the map, the player updates including respective virtual frustum information for each player, generating an acceleration structure using the map information and the player updates, generating, for each player, respective primary rays from the respective virtual frustum associated with the player, determining, for each player, based on the respective primary rays and the acceleration structure, intersections between the respective primary rays and the respective player geometries on the map, and generating a visibility matrix based on at least the determined intersections, the visibility matrix comprising pair-wise visibility between the respective players on the map.

In accordance with a broad aspect of the present technology, there is provided a system for preventing wall hacking by using ray tracing to filter data packets to be provided to a plurality of user devices connected to the system during a video gaming session, each respective user device being associated with a respective player having a respective player geometry, the system comprising: a non-transitory storage medium comprising computer-readable instructions, and at least one processing device operatively connected to the non-transitory storage medium. The at least one processing device, upon executing the computer-readable instructions, being configured for: receiving map information for the gaming session, for a given iteration of a plurality of iterations during the gaming session: receiving player updates indicative of actions of the respective players on the map, the player updates including respective virtual frustum information for each player, generating an acceleration structure using the map information and the player updates, generating, for each player, respective primary rays from the respective virtual frustum associated with the player, determining, for each player, based on the respective primary rays and the acceleration structure, intersections between the respective primary rays and the respective player geometries on the map, generating a visibility matrix based on at least the determined intersections, the visibility matrix comprising pair-wise visibility between the respective players on the map, receiving outgoing data packets representative of player states on the map for the given iteration, filtering the outgoing data packets based on the visibility matrix to obtain respective filtered data packets for each player, and transmitting the respective filtered data packets to each of the plurality of user devices.

In one or more embodiments of the system, said at least one processing device is further configured for, prior to said generating the acceleration structure using the map information and the player updates: receiving current vantage point data, receiving future vantage point data, generating, for each player, using the current vantage point data and future vantage point data, a collated player geometry associated with the respective player, said generating the acceleration structure comprises further using collated player geometry.

In one or more embodiments of the system, said generating the acceleration structure comprises: generating a plurality of bottom-level acceleration structures based on map geometry instances in the map information and the respective player geometry, and combining the plurality of bottom-level acceleration structures to obtain a top-level acceleration structure to be used for determining intersection between the respective primary rays and the respective player geometries on the map.

In one or more embodiments of the system, receiving current vantage point data, receiving future vantage point data, and generate, for each of the respective virtual frustum associated with the player, a respective plurality of virtual frusta using the current vantage point data and future vantage point data from which the respective primary rays are launched.

In one or more embodiments of the system, receiving a set of force-casters and associated bounding spheres, determining if a given force-caster of the set of force-casters overlaps with a given primary ray, and in response to the given force-caster of the set of force-casters overlapping with the primary ray: launching further primary rays.

In one or more embodiments of the system, said at least one processing device is further configured for, prior to generating said visibility matrix: determining intersections between the respective rays and players on the map, involving a given light source, storing an indication of players having intersected rays having reached the given light source in association with the respective player having launched the primary ray that generated said respective rays, and said generating the visibility matrix comprises using the stored indications of players.

In one or more embodiments of the system, further comprising, prior to said generating the visibility matrix: receiving a respective ping associated with each player, in response to the ping associated with at least one given player being above a predetermined threshold: determining respective origins for each of a plurality of virtual sub-frusta obtained for the respective virtual frustum for each respective player, clipping the respective origins against the map, determining respective threshold distances from a center of a geometry of each respective player, the respective threshold distances being proportional to the geometry of the respective player, generating, based on the respective threshold distances, at least one bottom level acceleration structure for each respective player, and generating, using the bottom level acceleration structures, a top-level acceleration structure for the at least one given player, the top-level acceleration structure to be used for determining intersecting primary rays of the at least one given player originating from at least the respective clipped origins.

In one or more embodiments of the system, said player geometries comprise player armatures, said generating, for each player, respective primary rays from the respective virtual frustum associated with the player comprises: determining respective difference vectors between each originating player and a centroid of each remaining player armature, determining if lengths of the respective difference vectors are above a predetermined threshold, the predetermined threshold being based on the respective player armature, determining, for the respective difference vector lengths with lengths above the threshold, an angle based on the respective difference vectors and the respective primary rays, and in response to the angle being below a threshold, redirect the primary rays towards the player armatures to be used for determining further intersections for generating the visibility matrix.

In one or more embodiments of the system, said player geometries comprise bounding boxes, and said generating, for each player, respective primary rays from the respective virtual frustum associated with the player comprises: determining respective difference vectors between each originating player and a centroid of each remaining player bounding box, determining if lengths of the respective difference vectors are above a predetermined threshold, the predetermined threshold being based on respective the bounding box, determining, for respective difference vectors with lengths above the threshold, an angle based on the respective difference vectors and the respective primary rays, and in response to the angle being below a threshold, launch further primary rays to be used for determining further intersections for generating the visibility matrix.

In one or more embodiments of the system, said at least one processing device comprises a graphics processing unit (GPU).

Terms and Definitions

In the context of the present specification, "ray tracing" refers to a computer graphics technique whereby a line segment is tested against an amalgamation of 3D triangles in space in order to find an intersection.

In the context of the present specification "path-tracing" refers to a technique that utilizes multiple back-to-back and stochastic applications of ray tracing to simulate a travelling photon. It starts casting a ray of light from the viewer and aims to end it at a light source. This technique and its modern variants are used to generate photorealistic imagery in movies and, more recently, in video games. A transport path refers the complete path that a photon travels from a light source to the eye.

Throughput (Path-tracing): the carried amount of light as the path of a photon is being discovered during the path-tracing process.

In the context of the present specification, "Next Event Estimation" refers to a technique in path tracing whereby a ray is extended from a hit point towards a light source intentionally to increase the chances of interaction with a light source. This is commonly done in graphical applications to reduce noise especially when light sources are small (and thus harder to hit) or exist as a single point in space.

In the context of the present specification, "wall-hacking" refers to a colloquial term that has emerged to describe a particular kind of cheating in online first person and third person shooter video games. This kind of cheating enables a user to be able to observe enemy combatants through otherwise obscuring geometry, thereby providing the user with otherwise inaccessible knowledge and an unfair advantage over the opposing team.

In the context of the present specification, a "Player Frustum" refers to a virtual pyramid stretched out from the vantage point of an observer that defines the observer's field of view.

In the context of the present specification, Graphics API refers to an application programming interface used to render computer graphics.

In the context of the present specification, a "Headless Instance" refers to an instance of a graphics API used to render only to a piece of memory instead of a display output (i.e. monitor). Such an instance is useful for General Purpose GPU computations (GPGPU).

In the context of the present specification, "texture" refers to a single or a collection of 2D, 3D or cube images used in graphics APIs to store color information.

In the context of the present specification, "sampler" refers to refer to an abstraction in graphics APIs around textures, where every texture may come with an accompanied sampler to filter the texture upon color retrieval in order to improve appearance. Samplers commonly have hardware units in video cards in order to speed up retrieval, filtering and provisioning of color output.

In the context of the present specification, a "material" refers to a collection of samplers used to define the appearance of a surface. These samplers can define different aspects of the material such as roughness, emissivity, specularity amount, albedo color, specular color and other attributes of the material.

In the context of the present specification, a "geometry instance" refers to a piece of geometry (i.e. a collection of 3D triangles) usually with a single material. However, this is not a hard requirement as some game engines may support geometry instances with more than one material.

In the context of the present specification, a "thread" refers to computer instructions that run simultaneous to other instructions in a computer program In the context of the present specification, "temporal super-sampling" refers to a technique used in rendering to obtain more geometry and lighting information not available at a fixed resolution by perturbing initial rendering conditions (i.e. the frustum) and accumulating results over time. In its most prevalent form the acquired limited history of results is averaged to provide anti-aliased output.

In the context of the present specification, "ray masks" or "object masks" refers to a mechanism to allow rays to ignore or include certain objects based on bitwise AND operations involving binary numbers (dubbed 'masks') assigned to objects and rays alike. If a bitwise AND operation between an object and a ray's mask yields a non-zero number The intersection test occurs. Otherwise The intersection test is ignored.

Dot Product (Algebra): An algebraic operation involving two vectors (i.e. 'directions'). It is commonly used to get a measure of the angle between the two.

In the context of the present specification, a "server" is a computer program that is running on appropriate hardware and is capable of receiving requests (e.g., from electronic devices) over a network (e.g., a communication network), and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expressions "at least one server" and "a server".

In the context of the present specification, "electronic device" is any computing apparatus or computer hardware that is capable of running software appropriate to the relevant task at hand. Thus, some (non-limiting) examples of electronic devices include general purpose personal computers (desktops, laptops, netbooks, etc.), mobile computing devices, smartphones, and tablets, and network equipment such as routers, switches, and gateways. It should be noted that an electronic device in the present context is not precluded from acting as a server to other electronic devices. The use of the expression "an electronic device" does not preclude multiple electronic devices being used in receiving/sending, carrying out or causing to be carried out any task or request, or the consequences of any task or request, or steps of any method described herein. In the context of the present specification, a "client device" refers to any of a range of end-user client electronic devices, associated with a user, such as personal computers, tablets, smartphones, and the like.

In the context of the present specification, the expression "computer readable storage medium" (also referred to as "storage medium" and "storage") is intended to include non-transitory media of any nature and kind whatsoever, including without limitation RAM, ROM, disks (CD-ROMs, DVDs, floppy disks, hard drivers, etc.), USB keys, solid state-drives, tape drives, etc. A plurality of components may be combined to form the computer information storage media, including two or more media components of a same type and/or two or more media components of different types.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, lists of words, etc.

In the context of the present specification, unless expressly provided otherwise, an "indication" of an information element may be the information element itself or a pointer, reference, link, or other indirect mechanism enabling the recipient of the indication to locate a network, memory, database, or other computer-readable medium location from which the information element may be retrieved. For example, an indication of a document could include the document itself (i.e. its contents), or it could be a unique document descriptor identifying a file with respect to a particular file system, or some other means of directing the recipient of the indication to a network location, memory address, database table, or other location where the file may be accessed. As one skilled in the art would recognize, the degree of precision required in such an indication depends on the extent of any prior understanding about the interpretation to be given to information being exchanged as between the sender and the recipient of the indication. For example, if it is understood prior to a communication between a sender and a recipient that an indication of an information element will take the form of a database key for an entry in a particular table of a predetermined database containing the information element, then the sending of the database key is all that is required to effectively convey the information element to the recipient, even though the information element itself was not transmitted as between the sender and the recipient of the indication.

In the context of the present specification, the expression "communication network" is intended to include a telecommunications network such as a computer network, the Internet, a telephone network, a Telex network, a TCP/IP data network (e.g., a WAN network, a LAN network, etc.), and the like. The term "communication network" includes a wired network or direct-wired connection, and wireless media such as acoustic, radio frequency (RF), infrared and other wireless media, as well as combinations of any of the above.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 4 depicts a schematic diagram of a first person view in a video game in accordance with one or more non-limiting embodiments of the present technology.

DETAILED DESCRIPTION

Figure 1:
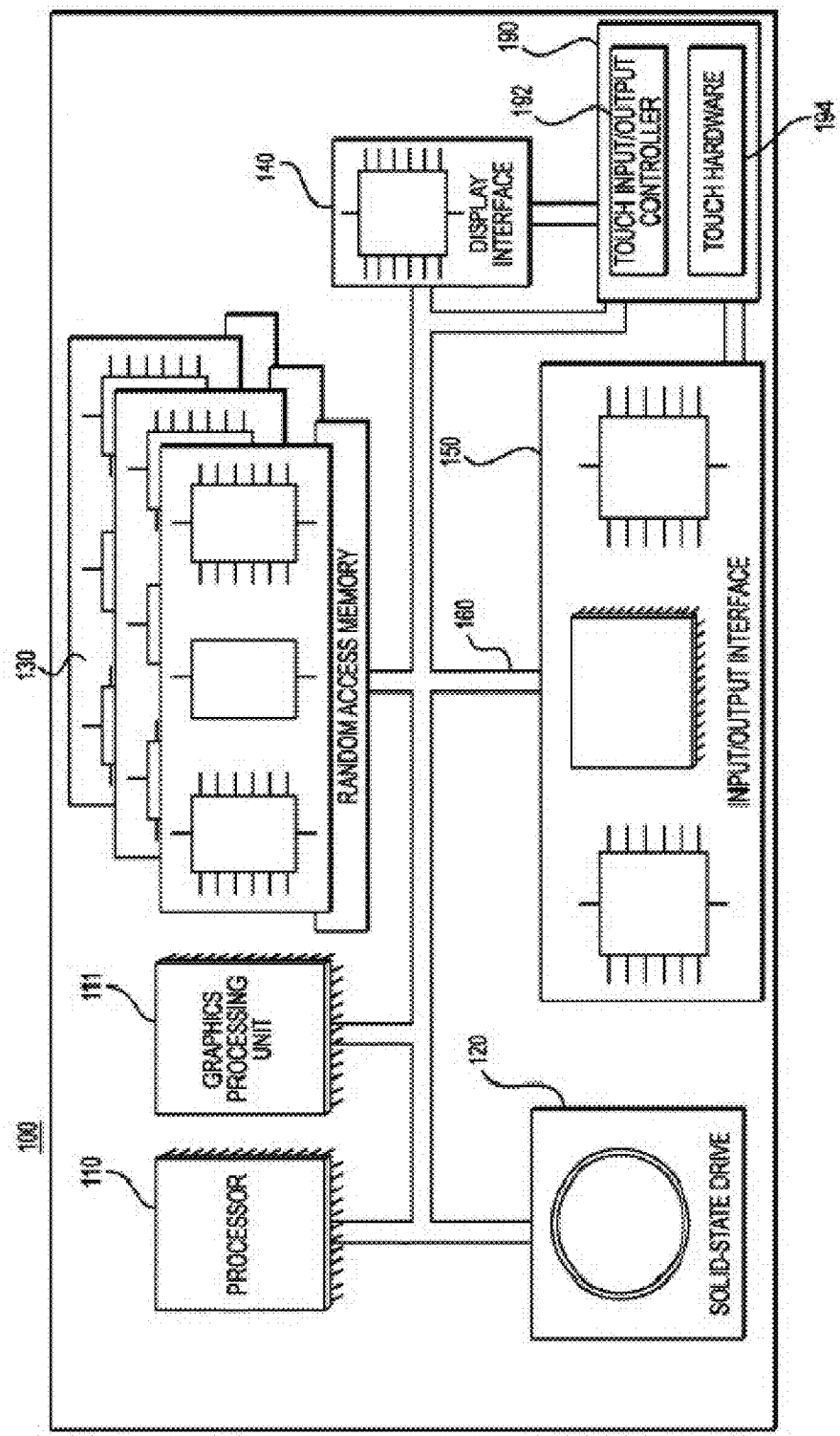
FIG. 1 depicts a schematic diagram of an electronic device in accordance with one or more non-limiting embodiments of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor" or a "graphics processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In one or more non-limiting embodiments of the present technology, the processor may be a general purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

Electronic Device

Referring to FIG. 1, there is shown an electronic device 100 suitable for use with some implementations of the present technology, the electronic device 100 comprising various hardware components including one or more single or multi-core processors collectively represented by processor 110, a graphics processing unit (GPU) 111, a solid-state drive 120, a random access memory 130, a display interface 140, and an input/output interface 150.

A Graphics Processing Unit or a GPU is an electronic hardware unit designed to provide visuals for computers. It can either be a separate piece of hardware installable on a motherboard, integrated into a motherboard or provided alongside a CPU on the same chip. Modern GPUs are backed by massively parallel processors capable of intensive mathematical computations.

Communication between the various components of the electronic device 100 may be enabled by one or more internal and/or external buses 160 (e.g. a PCI bus, universal serial bus, IEEE 1394 "Firewire" bus, SCSI bus, Serial-ATA bus, etc.), to which the various hardware components are electronically coupled.

The input/output interface 150 may be coupled to a touchscreen 190 and/or to the one or more internal and/or external buses 160. The touchscreen 190 may be part of the display. In one or more embodiments, the touchscreen 190 is the display. The touchscreen 190 may equally be referred to as a screen 190. In the embodiments illustrated in FIG. 1, the touchscreen 190 comprises touch hardware 194 (e.g., pressure-sensitive cells embedded in a layer of a display allowing detection of a physical interaction between a user and the display) and a touch input/output controller 192 allowing communication with the display interface 140 and/or the one or more internal and/or external buses 160. In one or more embodiments, the input/output interface 150 may be connected to a keyboard (not shown), a mouse (not shown) or a trackpad (not shown) allowing the user to interact with the electronic device 100 in addition or in replacement of the touchscreen 190.

According to implementations of the present technology, the solid-state drive 120 stores program instructions suitable for being loaded into the random-access memory 130 and executed by the processor 110 and/or the GPU 111 for preventing wall hacking in video games by using server-side ray tracing. For example, the program instructions may be part of a library or an application.

The electronic device 100 may be implemented as a server, a desktop computer, a laptop computer, a tablet, a smartphone, a personal digital assistant or any device that may be configured to implement the present technology, as it may be understood by a person skilled in the art.

System

Figure 2:
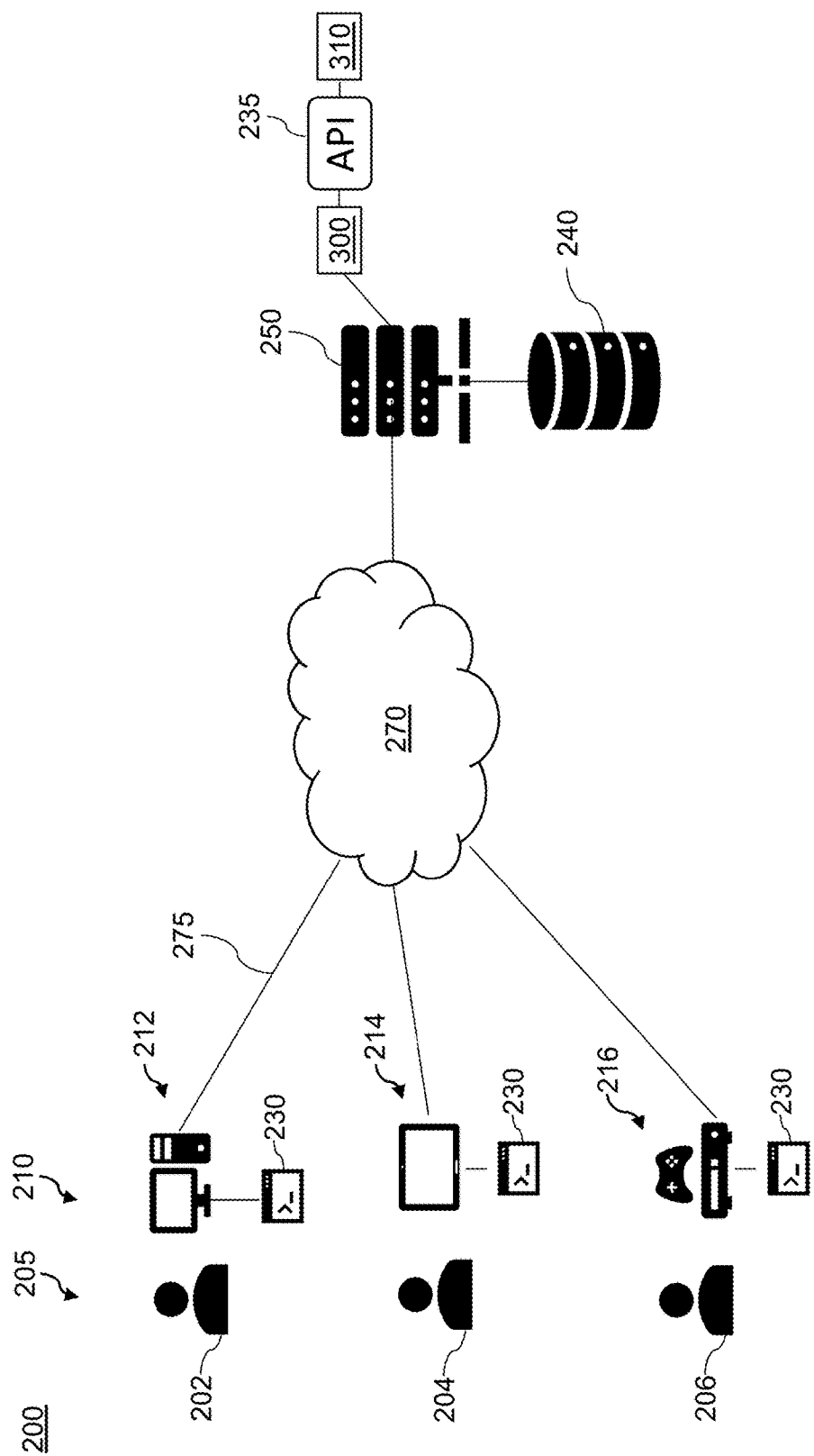
FIG. 2 depicts a schematic diagram of a communication system in accordance with one or more non-limiting embodiments of the present technology.

Referring to FIG. 2, there is shown a schematic diagram of a system 200, the system 200 being suitable for implementing one or more non-limiting embodiments of the present technology. It is to be expressly understood that the system 200 as shown is merely an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 200 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e., where no examples of modifications have been set forth), it should not be interpreted that no modifications are possible and/or that what is described is the sole manner of implementing that element of the present technology. As a person skilled in the art would understand, this is likely not the case. In addition, it is to be understood that the system 200 may provide in certain instances simple implementations of the present technology, and that where such is the case they have been presented in this manner as an aid to understanding. As persons skilled in the art would understand, various implementations of the present technology may be of a greater complexity.

The system 200 comprises inter alia a plurality of client devices 210, a game server 250, and a database 240 communicatively coupled over a communications network 270.

Client Device

The system 200 comprises the plurality of client devices 210 or plurality of user devices 210. The plurality of client devices 210 are associated with a plurality of users 205, respectively.

As depicted in FIG. 2, the plurality of client devices 210 comprises a first client device 212 associated with a first user 202, a second client device 214 associated with a second user 204, and a third client device 216 associated with a third user 206. It will be appreciated that the number of client devices 210 is not limited and may include more or less client devices.

As such, each of the client devices 212, 214, 216 can sometimes be referred to as a "electronic device", "user device", "end user device" or "client electronic device".

Each of the client devices 210 comprises one or more components of the electronic device 100 such as the processor 110, the graphics processing unit (GPU) 111, the solid-state drive 120, the random access memory 130, the display interface 140, and the input/output interface 150.

It will be appreciated that in some embodiments, each client device 212, 214, 216 may be implemented differently.

Each of the plurality of client devices 210 is configured to execute a game client application 230 (not separately numbered).

Game client application 230 may be specific to a game or may be used to host multiple different games, with video for a game being presented using a display of the client device 212, 214, 216 and interacted with using input/output interfaces of the client device 212, 214, 216. In at least one embodiment, game data may also be stored locally to a database (not shown) or persistent storage device on that client device 212, 214, 216. In at least one embodiment, a processing device of the client device 212, 214, 216 is a central processing unit (CPU). In at least one embodiment, the client device 212, 214, 216 may also utilize one or more graphics processing units (GPUs) for executing game code.

Game client application 230 may be obtained over a network, and/or through any of variety of other mechanisms including, but not limited to a portable computer readable storage medium, such as a portable memory device, a DVD, or the like.

The users 202, 204, 206 use respective client devices 212, 214, 216 to execute game client application 230 and interact in an environment together during a gaming session by transmitting and receiving data from the game server 250 and/or to each other.

Each of the users 202, 204, 206 can provide input to the respective client devices 212, 214, 216. The input can be or include, for example, a tap or swipe on a touch screen, a point and click with a mouse, and/or one or more entries on a keyboard.

Data corresponding to the input is transmitted from the user interface of the client device 212, 214, 216 along a path to the game event procedure executed by the game server 250 which determines and/or manages game events for the game based on the user input. The game events are generally actions or movements taken by a player or a player's character or avatar in the virtual environment for the online game.

During a given gaming session executed by the game client application 230, each user 202, 204, 206 is associated with a respective character in the multiplayer game that interacts in a virtual environment. The virtual environment may for example include a map.

As such, the user 202, 204, 206 controlling its respective associated character via the respective client device 212, 214, 216 may be referred to as respective player 212, 214, 216. Each player 212, 214, 216 is associated with identifier.

It will be appreciated that the nature of the character, attributes and possible actions depend on the game provided by the game client application 230 and the game server 250.

As a non-limiting example, the game client application 230 and the game server 250 may provide a third person shooter and/or a first person shooter game.

Non-limiting examples of multiplayer video games include the Call of Duty franchise, the Counter Strike franchise, the Quake franchise, Halo franchise and the like.

Game Server

The game server 250 is configured to inter alia: (i) host an online gaming environment accessible by the plurality of client devices 210 via the game client application 230; (ii) provide online gaming sessions in virtual environments for interaction by the plurality of client devices 210 by executing a game event procedure; (iii) connect to API 235 executing a visibility determination procedure 310; (iv) receive user inputs in the virtual gaming environment from the plurality of client devices 210; (v) process the user inputs in the virtual gaming environment; (vi) update the online game state based on at least the processed user inputs; (vii) perform a visibility determination procedure 310 using the API 235; (viii) filter outgoing data packets using a data filtering procedure 300 based on the outcome of the visibility determination procedure 310; and (ix) provide filtered data packets including updated game states to the client devices 210.

It will be appreciated that (ii)-(ix) may be executed a plurality of times, sequentially, in parallel or a combination thereof.

The game server 250 is an authoritative source of events in the game—it receives and processes player data, while also transmitting game play data to allow connected plurality of client devices 210 to maintain their own versions of the game world for display in the game client application 230.

In some embodiments, the game server 250 may be hosted or implemented locally, remotely, centrally, distributively, in the cloud, or in any other manner that provides the data communication infrastructure needed for online gaming with the plurality of client devices 210. As such, the game server 250 may also represent a tournament server or an eSport server, which may contain additional modules or components to support competitive gaming broadcast, streaming, and processing.

The game server 250 is configured to perform filtering of data packets to be provided to the plurality of client devices 210 by executing the data filtering procedure 300 so as to prevent wall hacking in the video game. To achieve that purpose, the game server 250 connects to the API 235 to perform a visibility determination procedure 310, and uses the output of the visibility determination procedure 310 to perform filtering of packets by executing the data filtering procedure 300.

The game server 250 has components that are sufficient to execute visibility determination procedure 310 as fast as the time it takes to render one frame of the game state for each client device 212, 214, 216.

As a non-limiting example, a game server 250 with sufficient capabilities to implement one of NVIDIA OptiX™ Ray Tracing Engine, real-time rendering pipelines that voxelize the scene for the purpose of tracing rays crudely, (signed) distance fields (SDFs), and other geometric primitives may be sufficient to perform the visibility determination procedure 310 as will be described herein.

As a non-limiting example, a game server 250 may have as a GPU a RTX 2070 SUPER from NVIDIA to host a single CS:GO gaming session including 10 players at 128 tics.

How the game server 250 is configured to do so will be explained in more detail herein below.

It will be appreciated that the game server 250 can be implemented as a conventional computer server and may comprise at least some of the features of the electronic device 100 shown in FIG. 1. In a non-limiting example of one or more embodiments of the present technology, the game server 250 is implemented as a server running an operating system (OS). Needless to say that the game server 250 may be implemented in any suitable hardware and/or software and/or firmware or a combination thereof. In the disclosed non-limiting embodiment of present technology, the game server 250 is a single server. In one or more alternative non-limiting embodiments of the present technology, the functionality of the game server 250 may be distributed and may be implemented via multiple servers (not shown).

In some embodiments of the present technology, at least one of the components may be provided with encryption using any of a variety of encryption mechanisms. In one or more other embodiments, no components may be provided with encryption.

The implementation of the game server 250 is well known to the person skilled in the art. However, the game server 250 comprises a communication interface (not shown) configured to communicate with various entities (such as the database 240, for example and other devices potentially coupled to the communication network 270) via the communication network 270. The game server 250 further comprises at least one computer processor (e.g., the processor 110 of the electronic device 100) operationally connected with the communication interface and structured and configured to execute various processes to be described herein.

Database

A database 240 is directly coupled to the game server 250. In one or more alternative implementations, the database 240 may be communicatively coupled to the game server 250 over the communication network 270 without departing from the teachings of the present technology. In one or more other embodiments, the database 240 may be optional. Although the database 240 is illustrated schematically herein as a single entity, it will be appreciated that the database 240 may be configured in a distributed manner, for example, the database 240 may have different components, each component being configured for a particular kind of retrieval therefrom or storage therein.

The database 240 may be a structured collection of data, irrespective of its particular structure or the computer hardware on which data is stored, implemented or otherwise rendered available for use. The database 240 may reside on the same hardware as a process that stores or makes use of the information stored in the database 240 or it may reside on separate hardware, such as on the game server 250. The database 240 may receive data from the game server 250 for storage thereof and may provide stored data to the game server 250 for use thereof.

In the context of the present technology, the database 240 is configured to store inter alia game information, player information and/or network information or any other type of information related to the processes described herein. In some embodiments, visibility determination results from data filtering procedure 300 may be stored for future analysis.

Communication Network

In one or more embodiments of the present technology, the communications network 270 is the Internet. In one or more alternative non-limiting embodiments, the communication network 270 may be implemented as any suitable local area network (LAN), wide area network (WAN), a private communication network or a combination thereof. It will be appreciated that implementations for the communication network 270 are for illustration purposes only. How a communication link 275 (not separately numbered) between the client device 210, the game server 250, the database 240, and/or another electronic device (not shown) and the communications network 270 is implemented will depend inter alia on how each electronic device is implemented.

Data Filtering Procedure

The game server 250 is configured to execute the data filtering procedure 300 via the API 235. The purpose of the data filtering procedure 300 is to filter outgoing data packets to be transmitted to each of the plurality of client devices 210 during a multiplayer gaming session so as to prevent wall-hacking.

As such, the data filtering procedure 300 is configured to inter alia: (i) receive outgoing data packets including updated game states; (ii) execute the visibility determination procedure 310 to obtain pair-wise visibility information of the plurality of users 205; and (iii) filter the outgoing data packets using the pair-wise visibility information to obtain filtered packets for each client device 212, 214, 216; and (iv) transmit the filtered data packets to each client device 212, 214, 216.

The data filtering procedure 300 further enables saving bandwidth by limiting data that is transmitted from the game to the client devices to only what is required for the users to play the game The data filtering procedure 300 starts off by launching an instance of a graphics API. The data filtering procedure 300 executes a headless instance, i.e., an instance without a graphical user interface (GUI). It will be appreciated that the instance may not be headless if the data filtering procedure 300 is launched with a debugging view. For example, if an operator of a game server uses a debugging view for debugging the present API 235, the instance will not be headless.

The API 235 launches the visibility determination procedure 310 in a separate thread which awaits feeding of samplers, material and map geometry instance information. It may be appreciated that procedure 300, the API 235 and visibility determination procedures 310 may not be threaded but embedded within and executed from the same thread as the game server 250.

Figure 3:
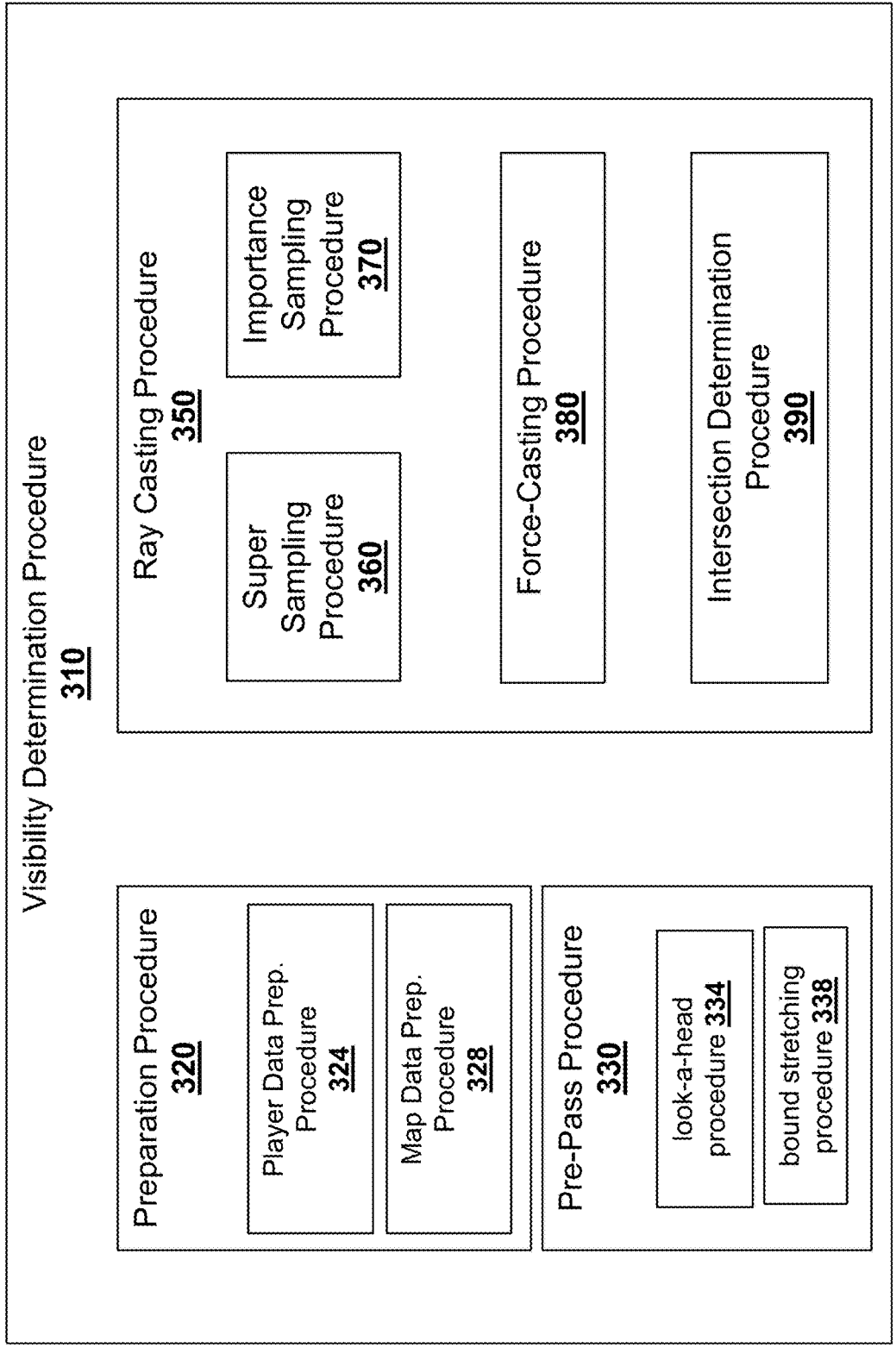
FIG. 3 depicts a schematic diagram of a data filtering procedure in accordance with one or more non-limiting embodiments of the present technology.

How the visibility determination procedure 310 is executed will now be explained with reference to FIG. 3.

Visibility Determination Procedure

The visibility determination procedure 310 is configured to determine pair-wise visibility information of the plurality of users 205 during one or more frames of a multiplayer gaming session.

In the context of the visibility determination procedure 310, the pair-wise visibility information between players is stored in a data structure which will be referred to as visibility matrix hereinafter. The visibility matrix is a square matrix representing the visibility of each player against every other player during the gaming session, as computed using the procedures described hereinafter. The visibility matrix is populated by using ray tracing techniques on the server side such that each client device 212, 214, 216 participating in the gaming session receives, from the gaming server 250, data packets that have been filtered using the visibility matrix, thus preventing the use of world hacking and wall hacking techniques that enable cheaters to see players that would be otherwise not visible in the environment or map (i.e., as intended by the video game operator or provider) due to objects or other types of opaque obstacles in the map.

Each player is associated with a respective player geometry surrounding its character.

The player geometry may include one of a bounding box and an armature. It will be appreciated that the type of player geometry depends on the type of game. The bounding box is a cuboid surrounding the respective player. The armature is a geometry surrounding the respective player.

In the visibility matrix, all player IDs are labelled on both the rows and the columns. Each cell within the visibility matrix contains a configurable number of Boolean flags that collectively indicate whether the player ID on the column can see the player ID indicated on the row. Each Boolean flag represents the player visibility in a different frame. Any bits within a cell being one represents a transmit decision on the server's part. Only a cell of all zeroes prevents a packet transmit decision.

Figures 6, 7:
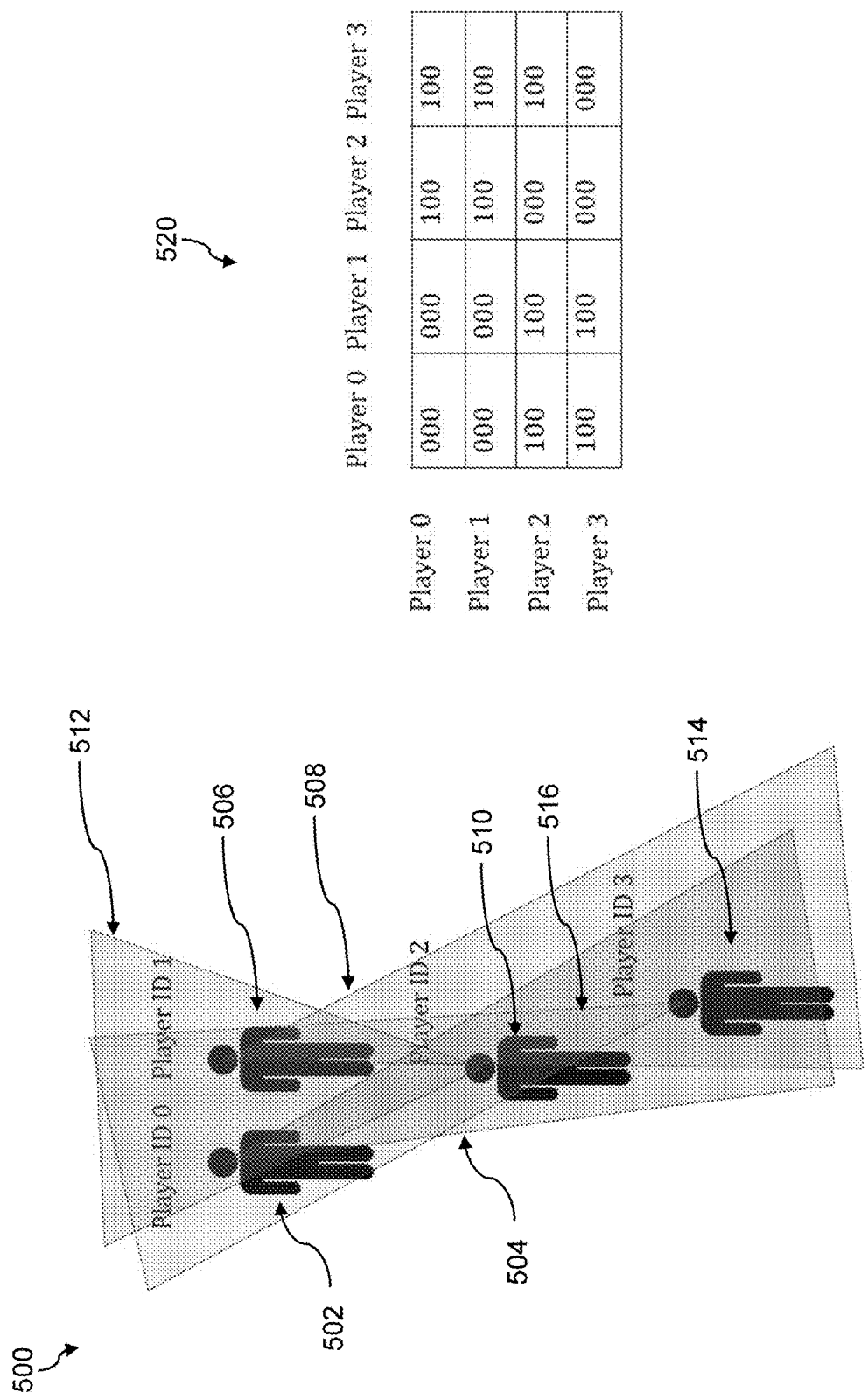
FIG. 6 depicts a schematic diagram of a scene involving four players in a video game and the associated visibility matrix in accordance with one or more non-limiting embodiments of the present technology.
FIG. 7 depicts a schematic diagram of the visibility matrix representing the scene of FIG. 6 in accordance with one or more non-limiting embodiments of the present technology.

Reference is now made to FIG. 6 and FIG. 7, which depict respectively a non-limiting example of a scene 500 involving four players in a video game and the associated visibility matrix 520 in accordance with one or more non-limiting embodiments of the present technology.

In the non-limiting example illustrated in FIG. 7, the visibility matrix 520 comprises three Boolean flag per cell, thus corresponding to the three different frames during the gaming session. The first frame is depicted in FIG. 6, and the second and third frames are set to 0 (not depicted)

The scene 500 comprises four players located at respective positions: a first player 502, a second player 506, a third player 510 and a fourth player 514. The scene 500 depicts a first frame in a first moment in time, which corresponds to the first digit in each cell of the visibility matrix 520. The visibility determination of one player against another player is an evaluation of whether any flags within a cell are equal to one. Given that the Boolean flags are stored in individual bits in memory, this temporal visibility determination simply reduces to vector comparisons aided by SIMD units inside the CPU arithmetic and logic units.

The first player 502 casts rays from the first virtual frustum 504. It can be seen that the third player 510 and the fourth player 514 are within the casted rays of the first virtual frustum 504. The second player 506 is not within the casted rays of the first virtual frustum 504. This is reflected in the first column of the visibility matrix 520 shown in FIG. 7.

The second player 506 casts rays from the second virtual frustum 508. It can be seen that a portion of the third player 510 and the fourth player 514 are within the casted rays of the second virtual frustum 508. The first player 504 is not within the casted rays of the second virtual frustum 508. This is reflected in the second column of the visibility matrix 520 shown in FIG. 7.

The third player 510 casts rays from the third virtual frustum 512. It can be seen that the first player 504 and the second player 506 are within the casted rays of the second virtual frustum 508. The fourth player 514 is not within the casted rays of the third virtual frustum 512. This is reflected in the third column of the visibility matrix 520 shown in FIG. 7.

The fourth player 514 casts rays from the fourth virtual frustum 516. It can be seen that a portion of each of the first player 502, the second player 506 and the third player 510 are within the casted rays of the second virtual frustum 508. This is reflected in the fourth column of the visibility matrix 520 shown in FIG. 7.

In some embodiments, each cell holds more than one flag because visibility determination for frames independent of each other may not be taken into account and a limited history of visibility may be taken into account. It will be appreciated that visibility is unidirectional: player 1 seeing player 2 does not guarantee that player 2 is in fact capable of seeing player 1. A frame counter is used and monotonically increases by one with every passing frame. The modulus of the frame counter with the number of Booleans that fit in a single cell determines which flag in every cell will be evaluated at any given frame. Beginning with every frame, flags associated with that frame in each cell are reset to zero indicating a lack of visibility.

The visibility determination procedure 310 casts rays from every player's virtual frustum using the player's aspect ratio. Each player's aspect ratio is received from the game server 250, and matches that of the player's. An under-reported ratio places the player at a disadvantage and an over-reported ratio should be rejected server-side and regarded as misinformation. This mechanism prevents players (i.e. client devices) from abusing the data filtering procedure 300. In scenarios where this information is not available, a reasonable maximum frustum aspect ratio is used for all players equally (e.g., 16:9).

With brief reference to FIG. 4, there is illustrated a non-limiting example of a simplified first person view frame in a video game hostable by the game server 250 and executable by the game client application 230 of a given one of the client devices 212, 214, 216.

The client device 212 controls first player 452 in first person view and may interact with the virtual environment or map (collectively represented by map elements 490). The map elements 490 may include walls, doors, objects, etc.

Other players 462, 468 participate in the online gaming session and also interact together and/or with the virtual environment. The first player 452 sees second player 462, which is located in front of him. Fourth player 468 (depicted in dotted lines) is located behind a wall and should not be normally visible to the first player 452. However, if the first player 452 uses wall hacking code on the game client application 230, the first player 452 may gain an unfair advantage over remaining players.

In the illustrated example, the procedures and methods described herein are intended to prevent first player 452 from wall hacking.

Figure 5A:
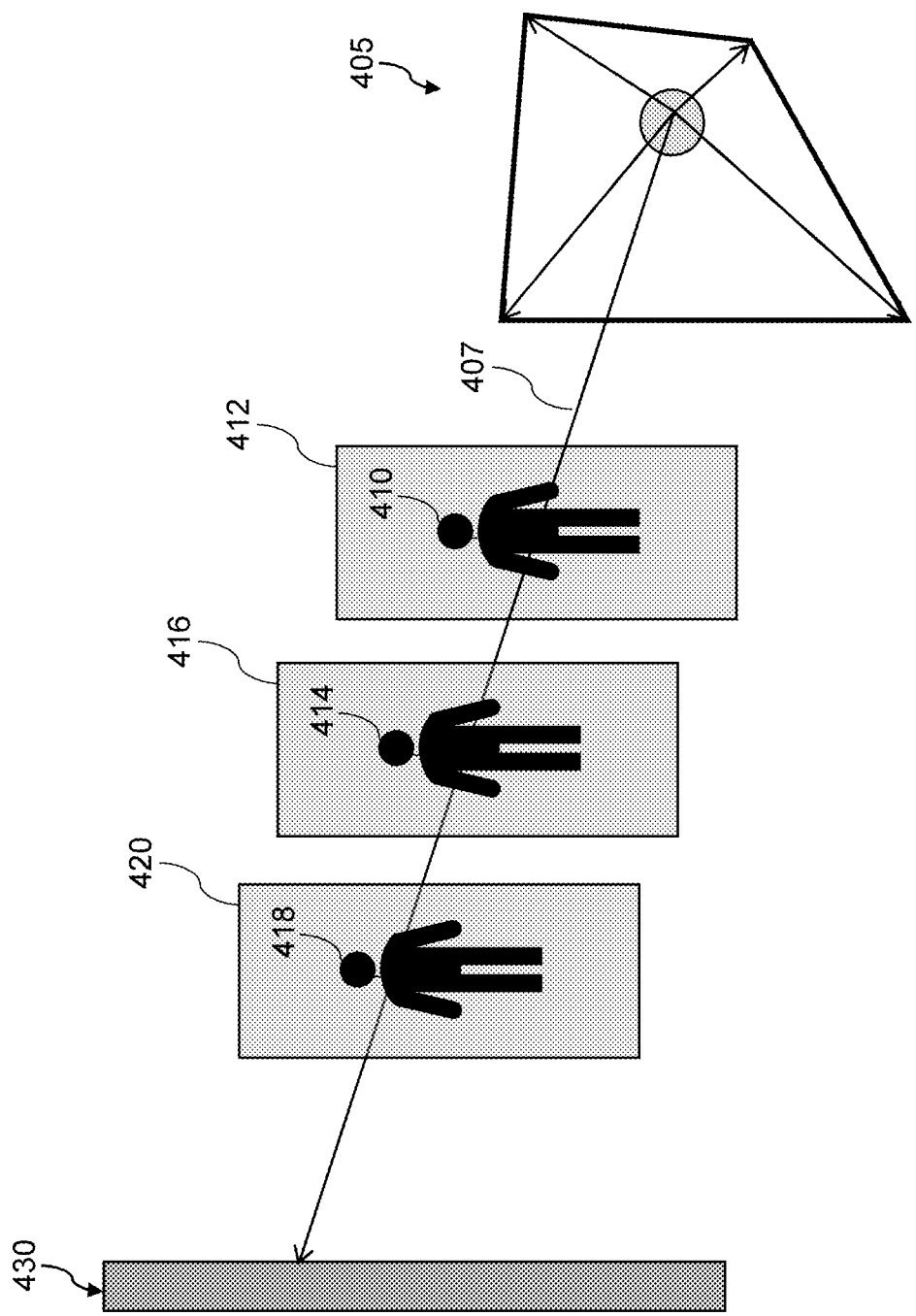
FIG. 5A depicts a schematic diagram of independent visibility player registration for servers providing bounding boxes in accordance with one or more non-limiting embodiments of the present technology.

In one or more embodiments where only bounding boxes are available, the rays will register player visibility as they intersect player bounding boxes and continue along the ray direction as if these intersections did not occur until encountering a solid wall. This prevents players' bounding boxes from hiding each other in the event that they line up behind each other visually. This scenario, which is referred to as an independent visibility scenario, is depicted in FIG. 5A, which illustrates a ray 407 casted from a player virtual frustum 405 intersecting with bounding boxes 412, 416, 420 of players 410, 414 and 418 until it encounters a solid wall 430.

Independent visibility includes any visibility generated by player geometry resulting from a sequence of rays casted irrespective of any source of light. As a non-limiting example, independent visibility can be a single ray casted directly from a viewer's frustum.

Figure 5B:
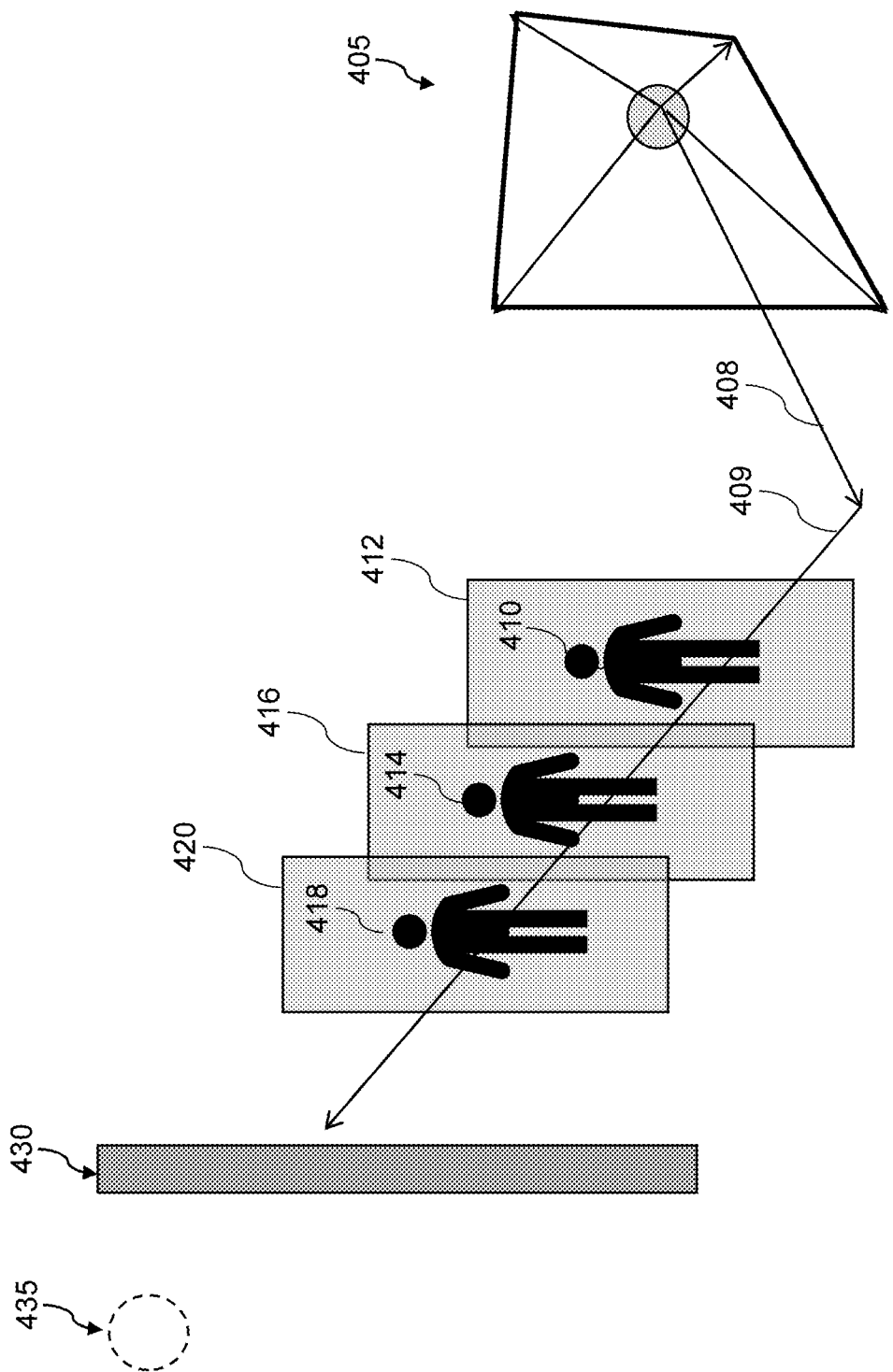
FIG. 5B depicts a schematic diagram of dependent visibility player registration for servers providing only bounding boxes in accordance with one or more non-limiting embodiments of the present technology.

Another scenario arises when a player's body is leaving casted shadows on the surrounding environment due to a source of light. This scenario is referred to as dependent visibility, and is depicted in FIG. 5B, where a secondary ray 409 is casted from an intersection of primary ray 408 originating from the player virtual frustum 405 is intersecting with bounding boxes 412, 416, 420 of players 410, 414 and 418 until it encounters a solid wall 430. With a sun 435 as a light source behind the solid wall 430. If the same visibility determination procedure 310 were to be used for FIG. 5B, it would falsely inform that 3 player shadows are visible, which is not true due to wall 430 behind those players obscuring player shadows.

Thus, to overcome this problem in the dependent visibility scenario, the visibility determination procedure 310 accumulates player IDs along the path into the ray's payload and only registers visibility for those accumulated players if the shadow ray fails to register a hit with the map. A non-limiting example of this packing strategy is illustrated below:

```
Layout (location = 0) rayPayloadInEXT struct {
/*
    2 bits:     rayMask compressed
    2 bits:     hitType
    1 bit:      secondary ray flag
    3 bits:     player hit booleans via secondary ray
    6 bits:     originating player ID
    6 bits:     1st player hit via secondary
    6 bits:     2nd player hit via secondary
    6 bits:     3rd player hit via secondary
*/
    uint rayMaskHitTypeSecFlagSecHitsPlayerIds;
} rayLoad;
```

In this example, the entire payload is represented using 32 bits and can contain dependent visibility for 3 players back to back. An additional 32 bits will be sufficient to accommodate dependent visibility for 4 more players (accounting for additional hit flags). It will be appreciated that such optimization is game-specific and has to be done on a per-game basis and involves knowing the upper bound on the number of players in a session at any given time. The ray mask is utilized to avoid intersecting friendly players as their information is always transmitted. The hit type indicates one of the following:

0) No hit was registered. The primary ray escaped to the sky.
1) Only the environment was hit by the primary ray.
2) Players were registered as independently visible via the primary ray.
3) Player hits were packed onto the ray payload via the shadow ray.

It will be appreciated that this information is useful for debugging and to also register dependent visibility at the end of a traversal if and only if a shadow ray missed the map, thus reaching the light source and leaving shadows of players intersected along the way.

Turning back to FIG. 3, the visibility determination procedure 310 comprises inter alia a preparation procedure 320 including map data preparation procedure 328 and a player data preparation procedure 324, a pre-pass procedure 330, and a ray-casting procedure 350.

In one or more embodiments, the ray casting-procedure 350 comprises one of a super sampling procedure 360 and an importance sampling procedure 370.

Additionally, a force-casting procedure 380 may be launched.

It will be appreciated that the electronic device executing the visibility determination procedure 310 does not require a display output.

In one or more embodiments, for example if the game supports player appearances with greatly varying materials, the visibility determination procedure 310 is configured to cache the range of materials that describe the varieties of player appearances to avoid retransmitting them later. The cached range of materials may be retained until the next map change.

Preparation Procedure

The updated player information is transmitted by each client device 212, 214, 216 to the game server 250. The updated player information comprises, for each client device 212, 214, 216 respectively, actions of the respective player on the map.

In one or more embodiments, the actions include one or more of: player actions related to movement (e.g., strafing, crouching, moving forward or backwards, jumping etc.), player actions resulting in changes in viewing direction (e.g., moving the mouse, gun recoil due to fired weapon etc.), player actions related to gameplay (e.g., firing bullets, opening doors, picking up items, etc.)

In one or more other embodiments, the actions may further include one or more of: entirely new player viewing directions, aspect ratio and vertical or horizontal field of view, entirely new player positions, player health, animation states, updated lighting information indicating dynamic lighting in the map, and changes to a subset of map geometry instances indicating a dynamic map.

The game server 250 updates the game state to obtain a current or updated game state based at least in part on the updated player information received from the plurality of client devices 210.

The game server 250 then transmits at least a portion (i.e., a subset) of the updated player information to the player data preparation procedure 324.

Player Data Preparation Procedure

The player data preparation procedure 324 is executed and receives, from the game server 250, at least a portion of the updated player information or player updates at every frame.

The player data preparation procedure receives, for each player or client device 212, 214, 216, current vantage point data and future vantage point data.

The current vantage point data includes, for each player, eye data, look data, up data, aspect ratio and y-field of view (FOV). It will be appreciated that eye data in this context refers to the current three dimensional location of the player's eye in space, look data refers to the current direction that the player is looking at described by a unit length vector in three dimensional space, up refers to a current direction pointing from the tip of the player's head towards the sky, again provided in unit length in three dimensional space. The up direction is orthogonal to the look direction (forms a 90 degrees celcius angle).

The future vantage point data includes, for each player: future eye, future look, future up, future aspect ratio and future y-FOV.

It will be appreciated that that the current vantage point data and the future vantage point data are determined by the game server 250 and provided to the player data preparation procedure 324.

In one or more embodiments, for example when the client devices 212, 214, 216 are located remotely (i.e., not in LAN), the player data preparation procedure 324 receives lagging indicators for each client device 212, 214, 216. The lagging indicators may include for example a ping associated with each player, or an indication that the ping is above a predetermined threshold known to the player data preparation procedure 324.

The updated player information comprises, for client device 212, 214, 216 respectively, actions of the respective player on the map.

In one or more embodiments where the video game executed by the game client application 230 and the game server 250 support dynamic map changes, the player data preparation procedure 324 receives indication of changes to the map.

In one or more embodiments where the video game executed by the game client application 230 and the game server 250 support dynamic lighting, the player data preparation procedure 324 receives indications of change to lighting information.

Figure 10:
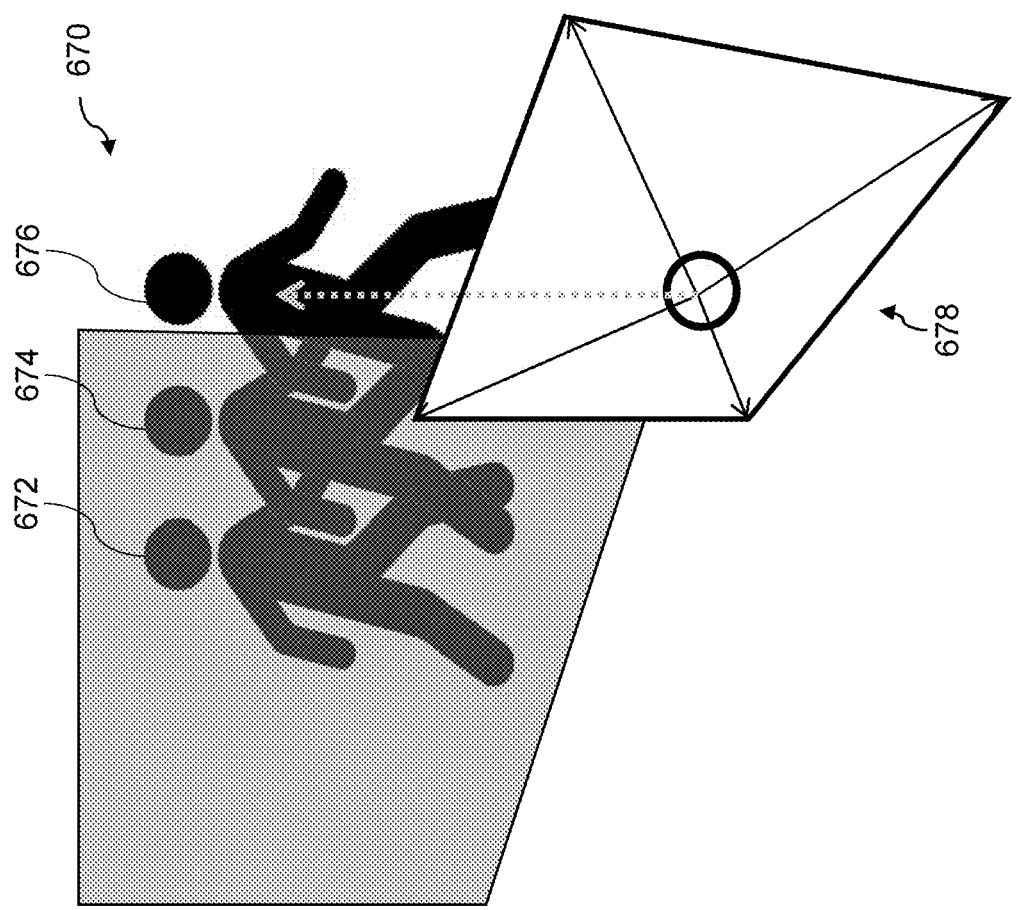
FIG. 10 depicts a schematic diagram of ahead of time visibility detection via overlapping armature geometry in accordance with one or more non-limiting embodiments of the present technology.

The player data preparation procedure 324 is configured to generate, for each player, based on the player geometry, the current vantage point data and the future vantage point data, respective collated player geometry. FIG. 10 shows an example of a collated player geometry 670, where a player is shown at a current time t (672), future time t+1 (674) and future time t+2 (676) with virtual frustum 678 from another player attempting to intersect the collated player geometry 670.

In one or more embodiments, the collated player geometry is generated using the current eye and future eye vantage point data.

In one or more other embodiments, the collated player geometry is generated further using a future bounding box. Such a future bounding box causes the dimensions of the bounding box to interpolate as well as its position while future versions of the bounding boxes are being generated and collated.

In one or more other embodiments, when armatures are available instead of bounding boxes, the player data preparation procedure 324 further uses current and future animation states to generate the collated player geometry.

The player data preparation procedure 324 thus obtains, for each player, a respective collated player geometry.

The player data preparation procedure 324 additionally initializes bits within the visibility determination matrix for the current frame to zero.

Map Preparation Procedure

The map data preparation procedure 328 receives map geometry instances.

In one or more embodiments, the map data preparation procedure 328 receives the samplers and materials for map geometry instances.

In one or more embodiments, the map data preparation procedure 328 further receives samplers and materials for players.

In one or more embodiments where the video game executed by the game client application 230 and the game server 250 support dynamic lighting, the map data preparation procedure 328 receives indications of change to lighting information.

The map data preparation procedure 328 is configured to generate an acceleration structure. The acceleration structure to generate comprises a top level acceleration structure (TLAS) comprised of a plurality of bottom-level acceleration structures (BLASes).

The map data preparation procedure 328 is configured to generate BLASes using the map geometry instances.

The BLASes are acceleration structures representing chunks of triangles or shapes arranged together on a top-down structure.

The map data preparation procedure 328 is configured to generate the TLAS by combining the BLASes of map geometry instances together.

The TLAS represents an entire scene. The two-level design of the TLAS allows composing different scenes by mixing and matching different BLASes together.

It will be appreciated that respective player and map geometry instance materials may be used alongside the TLAS.

The map data preparation procedure 328 outputs the TLAS.

Pre-Pass Procedure

The pre-pass procedure 330 is configured to generate look-a-head corners using a look-a-head procedure 334 and bound stretchings using a bound stretching procedure 338.

In one or more embodiments, the pre-pass procedure 330 is configured to generate acceleration structures including BLASes and a TLAS for lagging players only.

Look-a-Head

The look-a-head procedure 334 is configured to: (i) determine respective origins of each of the plurality of virtual sub-frusta; and (ii) clip the respective origins against the map.

In one or more embodiments, the look-a-head procedure 334 is configured to construct a ray segment starting from the player's current eye (i.e., origin) and ending at a quarter of the player's height above the eye, clip the ray segment against the map at a clipped position, and from the clipped position, build four additional ray segments aligned laterally with the four upper corners of the player's current bounding box.

The look-a-head procedure 334 is configured to repeat steps (i)-(ii) with the initial ray segment ending instead at half the player's height below the current eye. This provides another four (4) of the virtual sub-frusta origins.

In one or more embodiments, when armatures are available instead of bounding boxes, the look-a-head procedure 334 is configured to, from the clipped position, build four additional ray segments aligned laterally with the four upper corners of a bounding box surrounding the player armature.

Figure 11:
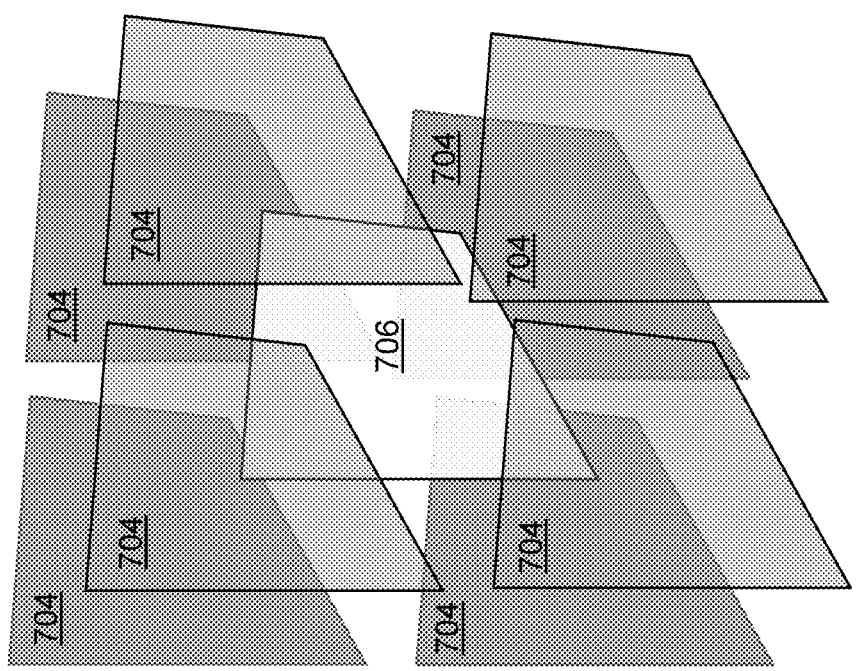
FIG. 11 depicts a schematic diagram of approximate arrangement of sub-frusta in accordance with one or more non-limiting embodiments of the present technology.

FIG. 11 illustrates an approximate arrangement of a plurality of sub-frusta 704 (not separately numbered) with a main sub-frusta 706 in accordance with one or more non-limiting embodiments of the present technology.

Bound Stretching Procedure

With insufficient virtual resolutions it is possible for distant players to become invisible as their occupied virtual screen real-estate shrinks. While in some embodiments, the visibility determination procedure 310 employs a jitter similar to temporal super-sampling to capture sub-pixel detail, additional measures may further be used. The pre-pass procedure determines how far player geometries (e.g., bounding boxes or armatures) can be stretched without exceeding twice their initial volume or intersecting the map world at large. The information gathered is used to increase player sizes as the virtual resolution shrinks, which is referred to as bound stretching.

The bound stretching procedure 338 is configured to inter alia: (i) receive the current player geometry (i.e., one of bounding box or current player armature); (ii) construct a ray segment from the center of the player geometry in the positive X direction with A times the size of the X dimension of the player geometry, where A is a configurable threshold, (e.g. A=1.13); (iii) clip the ray segment against the map; and (iv) obtain the stretch bound for the skewing player geometry in the positive X direction based on the clipped segment ray length.

The bound stretching procedure 338 is configured to repeat steps (i)-(iv) for the following directions and dimensions:
  Negative X direction, X dimension of player geometry (bounding box or armature): retrieving skewing bounds in the negative X direction
  Positive Y direction, Y dimension of player geometry (bounding box or armature): retrieving skewing bounds in the positive Y direction
  Negative Y direction, Y dimension of player geometry (bounding box or armature): retrieving skewing bounds in the negative Y direction
  Positive Z direction, Z dimension of player geometry (bounding box or armature): retrieving skewing bounds in the positive Z direction
  Negative Z direction, Z dimension of player geometry (bounding box or armature): retrieving skewing bounds in the negative Z direction The bound stretching procedure 338 thus obtains stretch bounds (i.e., threshold distances) as six (6) skewing amounts, one for each dimension and direction.

In one or more embodiments, the pre-pass procedure 330 is configured to generate a TLAS for lagging players. One or more of the plurality of players 210 may be determined to be lagging based on the lagging indication. In one or more embodiments, the pre-pass procedure 330 determines that players are lagging based on their respective pings being above a threshold.

The pre-pass procedure 330 is configured to use the stretch bounds or threshold distances to generate, for each player, an enlarged player BLAS. The pre-pass procedure 330 then generates an alternate (lagging) TLAS using enlarged player BLASes while reusing map instance geometry BLASes built during map data preparation procedure 328.

In one or more embodiments, the pre-pass procedure 330 uses materials for respective enlarged players and map geometry instances alongside the TLAS.

Ray-Casting Procedure

The ray-casting procedure 350 is configured to inter alia: (i) receive one or more of the TLAS, originating player IDs, current and future vantage point data for all players and in one embodiment ray masks representative of player team associations; (ii) trace rays; (iii) determine intersections between rays, players and other geometry based on one or more of the TLASes (iv) generate and populate a visibility matrix indicative of pair-wise visibility between players.

In one or more embodiments, the ray-casting procedure 350 is configured to divide, for each player, the respective virtual frustum into a plurality of sub-frusta to be placed on the look-a-head corners and the original vantage point (e.g., eye location).

Figure 9:
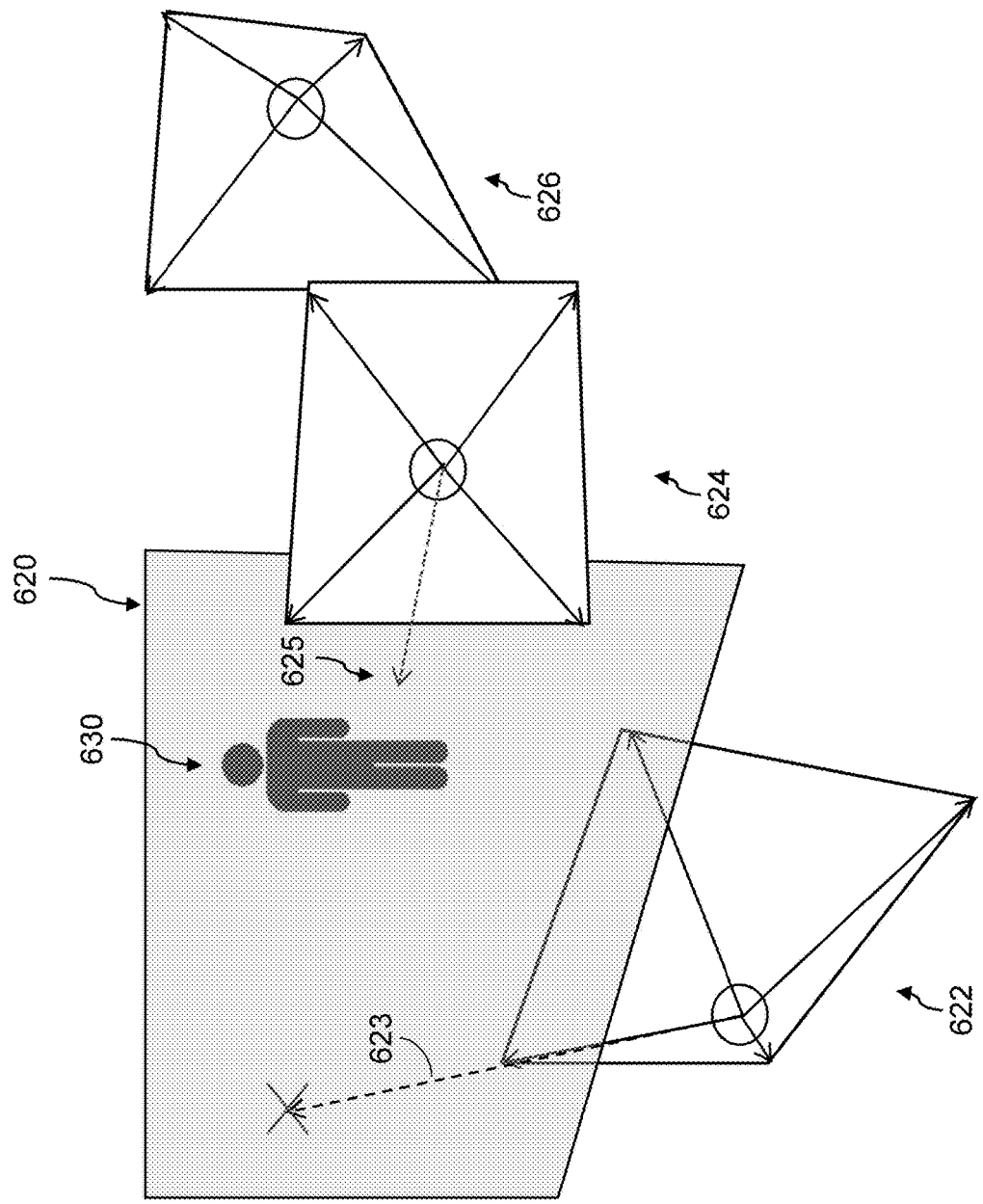
FIG. 9 depicts a schematic diagram of interpolated frusta for visibility detection ahead of time to combat latency in accordance with one or more non-limiting embodiments of the present technology.

In one or more embodiments, the ray-casting procedure 350 is configured to construct an in-between virtual frustum based on current vantage point data and future vantage point data for each player. Building in-between frusta is also referred to as viewer forward projection, as it produces some rays into the near future using future vantage point information. FIG. 9 demonstrates such an in-between frustum where each of in-between frusta 622, 624, 626 try to intersect player 630 behind wall 620. Ray 623 will fail because in-between frustum 622 is entirely behind the wall 620 while in-between frustum 624 is partially past the wall 620 and is able to capture player 630 via ray 625. It also showcases its usefulness in detecting players that are not currently visible but will be in the immediate future thus, allowing packets to be transmitted ahead of time to prevent sudden unnatural player appearances on client devices 210. Similarly, the usefulness of collated player geometry shown in FIG. 10 can also now be witnessed. Players that may not be visible now but will be momentarily due to their own initiated movements can also have their packets transmitted ahead of time to client devices 210 thanks to their collated geometries as shown in FIG. 10.

In one embodiment, the ray-casting procedure 350 uses in-between sub-frusta starting from look-a-head corners based on current vantage point data and future vantage point data for each player.

Figure 12:
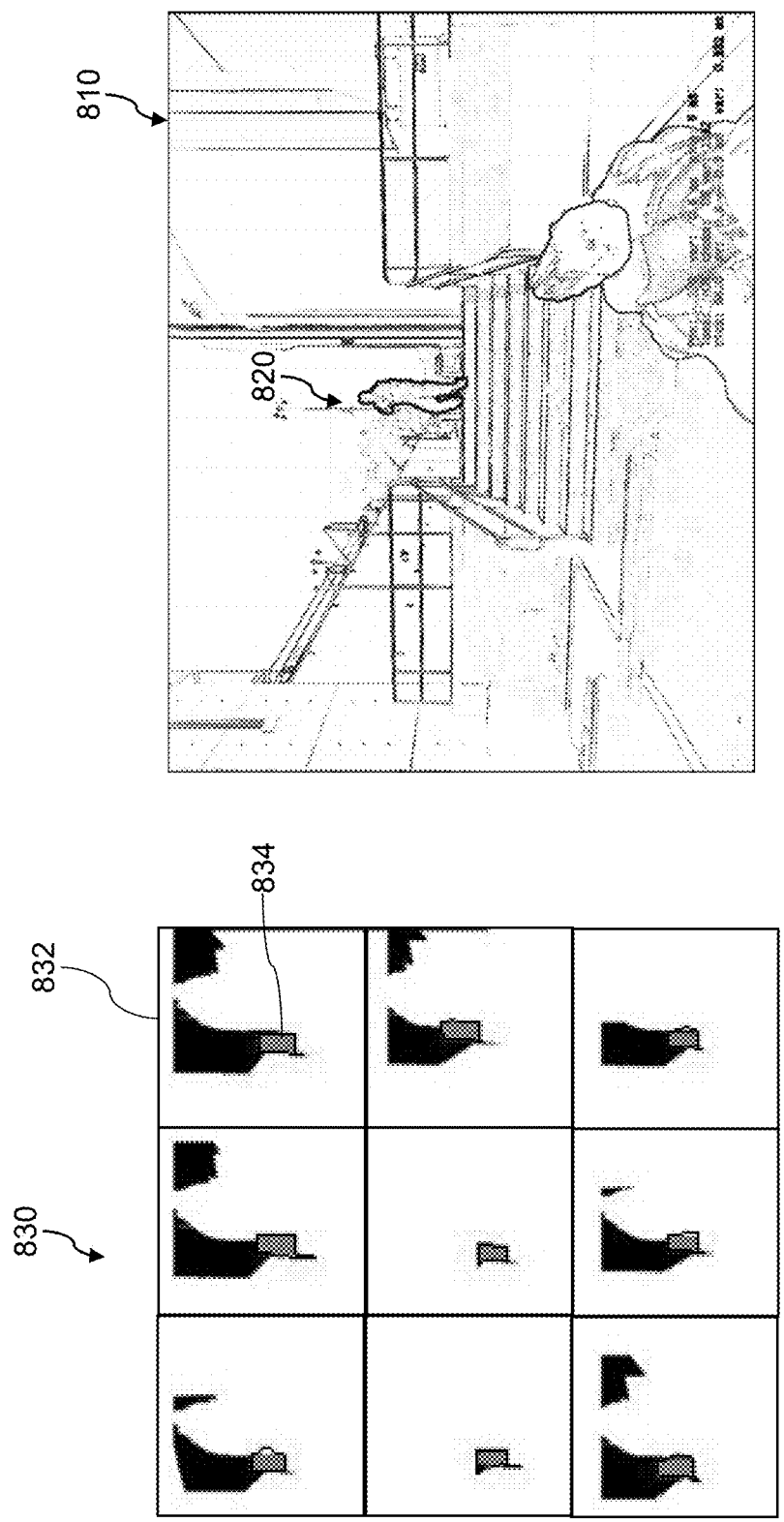
FIG. 12 depicts a schematic diagram of sub-frusta in action (left) in the CS:GO video game (right) in accordance with one or more non-limiting embodiments of the present technology.

FIG. 12 illustrates an example of sub-frusta in action in CS:GO using a debug view 830 (left) of a first person view 810 including enemy player 820 (right). In the debug view 830, a plurality of sub-frusta 832 (only one numbered) are visible, where each sub-frustum 832 includes a bound-stretched bounding box 834 of the enemy player 820.

In one or more embodiments, every look-a-head corner also conducts line-of-sight tests to every other enemy player in the game, which may be necessary because look-a-head corners alone will not be able to prevent surprise appearance caused by rapid head swings, as can they only account for popping resulting from lateral movement. Further, the ray casting procedure for a lagging player is configured to perform line-of-sight tests on three locations along player velocity vectors to account for forward projection of enemy positions. Much like force-casters each virtual pixel within a sub-frustum can either take on one or more line-of-sight tests dependent on sub-frusta resolutions.

As a non-limiting example, in a CS:GO implementation with a base resolution of 640×640, each sub-frustum will approximately have a resolution of 213×213. Given that the upper bound on player count is 64, the first 64 virtual pixel rows can naturally be associated with line-of-sight tests. Since each virtual row has also 213 virtual pixels the first three virtual pixels can trace along the combatant's velocity vector. This is our implemented approach for evenly distributing line-of-sight tests across virtual pixels.

In one or more embodiments where there is presence of lagging players, the ray-casting procedure 350 uses the lagging TLAS having been generated for lagging players.

The ray-casting procedure 350 casts rays.

It will be appreciated that a ray includes an origin, direction and parametric interval (TMin, TMax) in which intersections may occur at T locations along the interval. To be concrete, positions along the ray are: origin+T*direction (the direction does not get normalized).

In some embodiments the ray-casting procedure 350 is configured to execute one of a super sampling procedure 360 and an importance sampling procedure 370. In some embodiments both may lead to launching of a force-casting procedure 380.

The super sampling procedure 360 is executed when the respective player geometries are bounding boxes. The importance sampling procedure 370 is executed when the respective player geometries are armatures. The same force-casting procedure 380 may be executed for both bounding boxes and armatures.

Super Sampling Procedure

The visibility determination procedure 310 may use a super sampling procedure 360 to counter lowered resolutions.

The super sampling procedure 360 is configured to inter alia: (i) receive a collection of collated bounding boxes and their bounding spheres for each player; (ii) receive constructed in-between frustum or sub-frustum; (iii) receive primary rays in the constructed frustum or sub-frustum; —and (iv) potentially output further primary rays mimicking the initial primary ray with sub-pixel variations in ray direction.

It will be appreciated that the bounding sphere is determined using the bounding box.

In one or more embodiments, during the super sampling procedure 360, a cone is traced from every pixel starting from the eye with the area of the base being approximately pixel sized. Players with bounding spheres that are enveloped by this cone or overlap this cone are deemed to be sub-pixel. If a cone encounters a sub-pixel player, a number of additional rays—jittered differently—are allotted to attempt intersecting the sub-pixel player. This number scales relative to the distance measured against the furthest encountered player. It will be appreciated that it is a form of selective super-sampling and is done with the sole purpose of increasing the likelihood of visibility for sub-pixel players.

In one or more embodiments, the super sampling procedure 360 does not use exact cones, and verifies if the centroid of the player's collated geometry is sufficiently far enough from the viewer by using a predetermined multiple of its bounding sphere radius shrunk with increasing viewer pixel footprint.

Figure 8B:
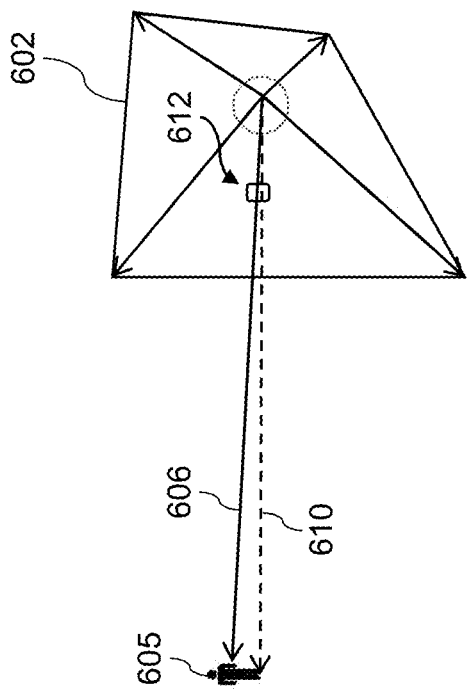
FIGS. 8A and 8B depict a schematic diagram of a two-step checking process for sub-pixel players in accordance with one or more non-limiting embodiments of the present technology.
Figure 8A:
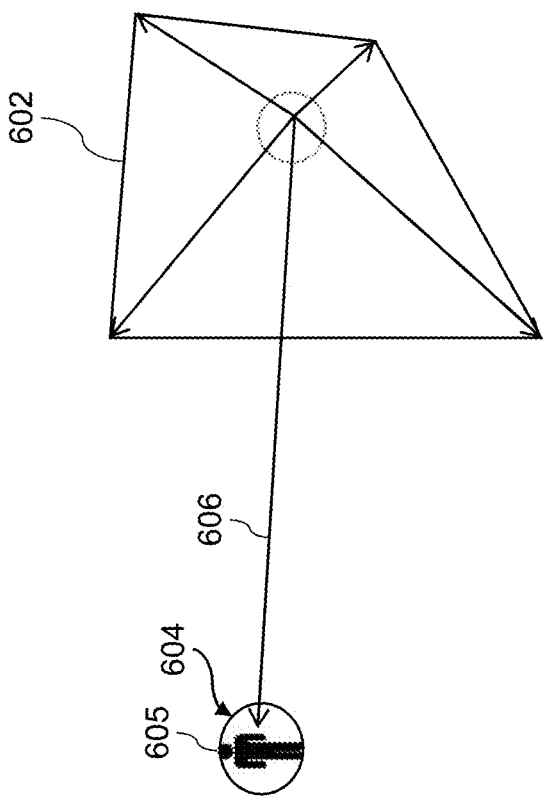

If the player is sufficiently far enough, the super sampling procedure 360 measures an angle difference via a dot product between the originally traced ray and a ray pointing to the player's geometric centroid. If this difference is below a threshold increased with increasing viewer pixel footprint, the player is deemed sub-pixel. This two step process is illustrated in FIG. 8A where a length of vector 606 between first player virtual frustum 602 and sphere surrounding player 604 is verified and in FIG. 8B, where angle difference 612 between the primary ray 610 and vector 606 is approximated using a dot product instead of using exact cones.

With one or more players deemed subpixel via the procedure outlined above it is expected that super sampling procedure 360 generates further primary rays mimicking the initial primary ray with sub-pixel variations in ray direction.

In one or more embodiments, the super sampling procedure 360 ignores players on the same team.

Importance Sampling Procedure

The importance sampling procedure 370 is configured to inter alia: (i) receive a collection of collated armatures of all players and their bounding spheres; (ii) constructed in-between frustum; (iii) primary rays in the constructed (sub-)frustum; and (iv) redirect primary rays towards locations on encountered player armatures.

The purpose of importance sampling procedure 370 is to redirect rays to a set of armatures that will potentially yield better results as the rays become more likely to intersect collated player geometry.

In one embodiment, the in-between frustum is determined to be a sub-frustum.

For every collated armature provided in (i), we execute the sub-pixel determination procedure described in the previous section for every primary ray.

If a collated armature is determined to be sub-pixel, a reference to it is added to a list of sub-pixel players for the primary ray that encountered it.

Every primary ray that has a non-empty list of sub-pixel players, selects one entry from that list and re-directs itself towards a location on the armature of the selected entry.

In one or more embodiments, the importance sampling procedure 370 ignores players in the same team.

Force-Casting Procedure

The force-casting procedure 380 is configured to inter alia: (i) receive a collection of force-casters and their bounding spheres; (ii) constructed in-between frustum; (iii) primary rays in the constructed (sub-)frustum; and (iv) casts additional rays uniformly on the surface of a number of chosen force-casters;

The force-casting procedure 380 casts an additional number of primary rays uniformly distributed across the surfaces of force-casters visible in the virtual frustum to cover openings in the map that may be missed during ray generation In one embodiment, the in-between frustum is determined to be a sub-frustum.

For every force-caster received, their bounding spheres are tested to be at least partially covered in the virtual frustum via the direction vector of the primary ray and a vector extended to the center of their bounding spheres. The threshold that the dot product is tested against factors in the radius of the bounding sphere. Primary must be deemed to be associated with launching force-casters. Otherwise they will not engage in this process.

If the force-caster is overlapping the direction vector of the primary ray, it will launch an additional number of primary rays each covering a unit area over the surface of the force-caster.

The number of additional primary rays depends on whether there are sufficient virtual pixels in the virtual frustum.

These additional primary rays will then attempt to cover openings in the environment that may otherwise be missed.

The intersection determination procedure 390 used by primary rays will now be explained below.

Intersection Determination Procedure

The intersection determination procedure 390 is used to determine intersections between rays (including primary and secondary, when applicable) and one or more of players, maps, light sources and optionally scattering materials so as to populate the visibility determination matrix. It will be appreciated that rays traverse the scene by traversing the TLAS.

In some embodiments, rays are set to use regular ray tracing (i.e. not use modified path-tracing).

In other embodiment, rays may be set to use modified path-tracing as will be explained below.

Figure 13:
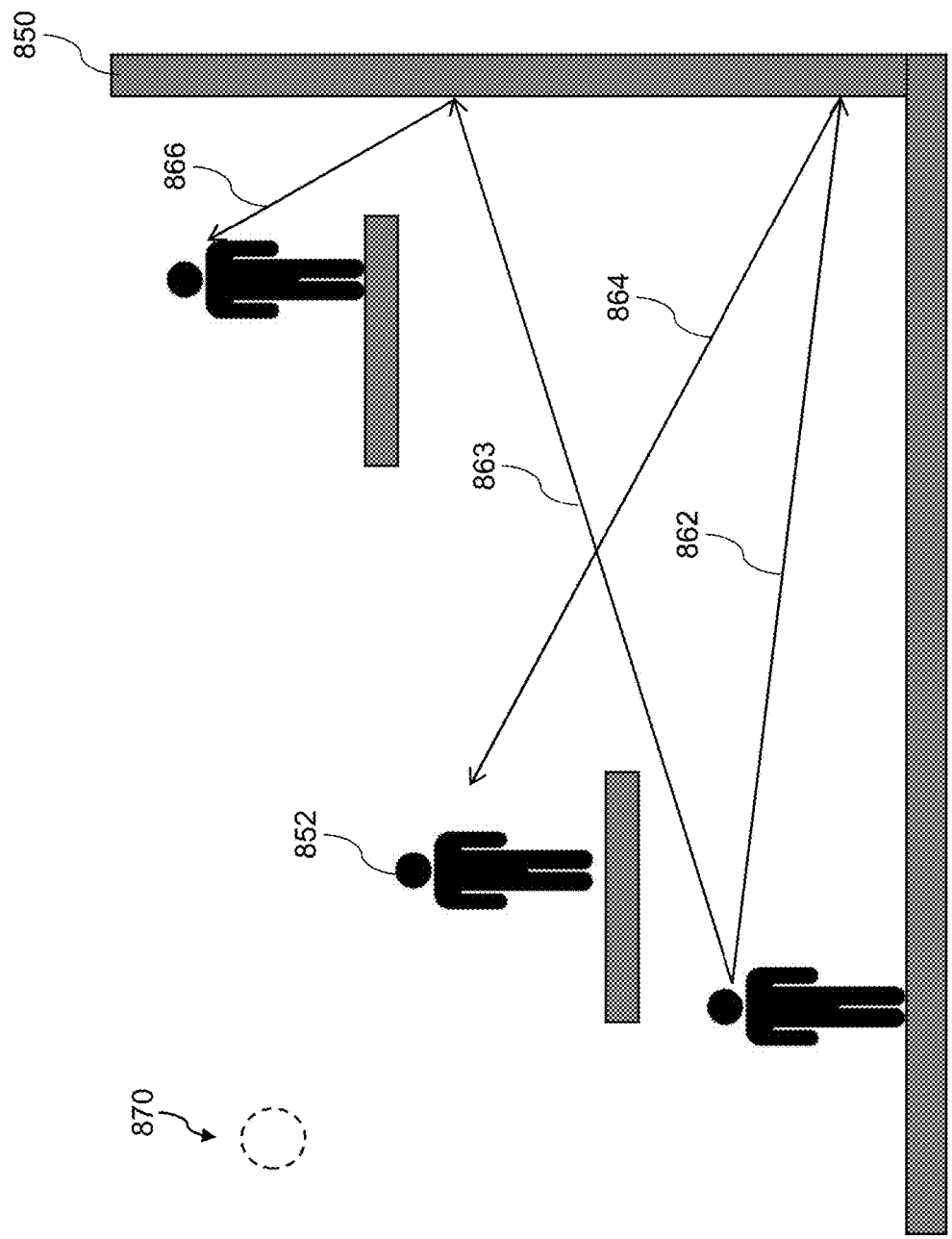
FIG. 13 depicts a schematic diagram of path tracing for visibility determination in accordance with one or more non-limiting embodiments of the present technology.

FIG. 13 shows a non-limiting example of path tracing with two primary rays 862, 863. Next Event Estimation (NEE) ray 864 obtained by the primary ray 862 intersecting the diffuse material 850 is trying to reach light source 870 but is being blocked by player 852. A diffuse secondary ray 866 is obtained by the primary ray 863 intersecting diffuse material 850.

Intersections Between Primary Rays and Players

In embodiments where path tracing is not used:

The intersection determination procedure 390 is configured to: (i) extract the originating player ID from the ray payload; (ii) locates the cell on the visibility matrix corresponding to the current originating player ID and the intersected player's ID; and (iii) sets the bit corresponding to the current frame to 1 (register independent visibility of encountered player).

The ray then continues traversal as if this intersection did not happen.

In embodiments where path tracing is used:

The intersection determination procedure 390 is configured to: (i) record the ID of the encountered player onto the ray payload (in preparation for dependent visibility); (ii) causes the ray to launch a secondary ray starting from the location of intersection towards a direction determined by the material properties of the intersected surface.

In one or more embodiments, the ray may launch an additional secondary ray starting from the location of intersection towards a subset of nearby light sources that are determined to have sufficient visual impact to intersect potential players via NEE (use NEE SBT).

Intersections Between Primary Rays and Map

In embodiments where path tracing is not used:

The intersection determination procedure 390 is configured to: (i) cause launching of an additional secondary ray starting from the location of intersection towards a subset of nearby light sources that are determined to have sufficient visual impact to intersect potential players via shadow rays;

In some embodiments, the ray may launch a secondary ray solely for the purpose of capturing global ambient occlusion (use AO SBT).

In some embodiments, if the intersected surface is determined to be mirror-like, the ray may launch a secondary ray starting from the location of intersection with the reflected direction of the primary ray off of the encountered surface for the purpose of capturing visibility in mirrors (use simple reflection SBT).

In embodiments where path tracing is used:

The intersection determination procedure 390 is configured to cause the ray to launch a secondary ray starting from the location of intersection towards a direction determined by the material properties of the intersected surface.

In one or more embodiments, the ray may launch an additional secondary ray starting from the location of intersection towards a subset of nearby light sources that are determined to have sufficient visual impact to intersect potential players via NEE (use NEE SBT).

In some embodiments, where it is determined to be intersecting scattering material: The intersection determination procedure 390 is configured to reduce ray strength based on scattering coefficient of the intersected material, and in response to the ray strength being reduced below a threshold, and terminate the ray.

It is contemplated that in alternative embodiments The intersection determination procedure 390 terminates ray based on the likelihood of termination via the scattering coefficient.

If the potentially encountered scattering material above has not resulted in a termination, continue as if no intersection has occurred.

No Intersections Reported

The intersection determination procedure 390 terminates the ray.

Intersections Between Primary Rays and Light Sources

The intersection determination procedure 390 terminates the ray.

The primary ray procedure has now potentially partially populated the visibility matrix.

Intersections Between Secondary Rays and Players

The ray traverses the scene by traversing the acceleration structure.

In some embodiments, the ray is set to not use modified path-tracing.

In other embodiments, the ray is set to use modified path-tracing.

Intersections Between Secondary Rays and Players (Simple Reflection SBT)

The intersection determination procedure 390 is configured to: (i) extract the originating player ID from the ray payload; (ii) locate the cell on the visibility matrix corresponding to the current originating player ID and the intersected player's ID; and (iii) set the bit corresponding to the current frame inside the cell is set to 1 (register independent visibility of encountered player); and (iv) the ray then continues traversal as if this intersection did not happen.

Intersections Between Secondary Rays and Map (Simple Reflection SBT)

If the intersected surface is mirror-like, the intersection determination procedure 390 is configured to: cause the ray to launch a secondary ray starting from the location of intersection with the reflected direction of the current secondary ray off of the encountered surface for the purpose of capturing visibility in mirrors (use simple reflection SBT).

If the intersected surface is not mirror-like, The intersection determination procedure 390 is configured to: launch a secondary ray starting from the location of intersection towards a subset of nearby light sources that are determined to have sufficient visual impact to intersect potential players via shadow rays.

Intersections Between Secondary Rays and Scattering Material (Simple Reflection SBT)

The intersection determination procedure 390 is configured to: (i) reduce ray strength via scattering coefficient of the intersected material; and (ii) if the ray strength is reduced below a threshold, terminate the ray.

In some embodiments, The intersection determination procedure 390 may terminate the ray based on the likelihood of termination via the scattering coefficient.

If the potentially encountered scattering material above has not resulted in a termination, continue as if no intersection has occurred.

No Intersections Reported (Simple Reflection SBT)

The intersection determination procedure 390 terminates the ray.

Intersections Between Secondary Rays and Players (AO SBT)

The intersection determination procedure 390 is configured to: (i) extract the originating player ID from the ray payload; (ii) locate the cell on the visibility matrix corresponding to the current originating player ID and the intersected player's ID; (iii) set the bit corresponding to the current frame inside the cell to 1 (i.e., register independent visibility of encountered player).

The ray then continues traversal as if this intersection did not happen.

Intersections Between Secondary Rays and all Other Scenarios (AO SBT)

When intersecting anything else or when finished looking for intersections (i.e. all other scenarios), The intersection determination procedure 390 is configured to terminate the ray.

Intersections Between Secondary Rays and Players (NEE SBT)

The intersection determination procedure 390 is configured to: (i) extract the originating player ID from the ray payload; (ii) locate the cell on the visibility matrix corresponding to the current originating player ID and the intersected player's ID; (iii) set the bit corresponding to the current frame inside the cell to 1 (register as if registering independent visibility of encountered player); and (iv) terminate the ray.

Intersections Between Secondary Rays all Other Scenarios (NEE SBT)

When intersecting anything else or when finished looking for intersections (i.e. all other scenarios), The intersection determination procedure 390 is configured to terminate the ray.

Otherwise:

Intersections Between Secondary Rays and Players (Otherwise)

In embodiments where modified path-tracing is not used
The intersection determination procedure 390 is configured to: (i) record the ID of the encountered player onto the ray payload (in preparation for dependent visibility).
The ray then continues traversal as if this intersection did not happen.

In embodiments where path tracing is used:
The intersection determination procedure 390 is configured to: (i) record the ID of the encountered player onto the ray payload (in preparation for dependent visibility); and (ii) causing the ray to launch a secondary ray starting from the location of intersection towards a direction determined by the material properties of the intersected surface.

In one or more embodiments, the ray may launch an additional secondary ray starting from the location of intersection towards a subset of nearby light sources that are determined to have sufficient visual impact to intersect potential players via NEE (use NEE SBT).

Intersections Between Secondary Rays and Map (Otherwise)

In embodiments where modified path-tracing is not used
The intersection determination procedure 390 is configured to terminate the ray.

In embodiments where path tracing is used:
The intersection determination procedure 390 is configured to cause the ray to launch a secondary ray starting from the location of intersection towards a direction determined by the material properties of the intersected surface.

In one or more embodiments, the ray may launch an additional secondary ray starting from the location of intersection towards a subset of nearby light sources that are determined to have sufficient visual impact to intersect potential players via NEE (use NEE SBT).

Intersections Between Secondary Rays and Scattering Materials (Otherwise)

The intersection determination procedure 390 is configured to: (i) reduce ray strength via scattering coefficient of the intersected material; and (ii) if ray strength is reduced below a threshold, terminate the ray.

In some embodiments, the intersection determination procedure 390 is configured to terminate ray based on the likelihood of termination via the scattering coefficient. Otherwise The intersection determination procedure 390 is configured to continue as if no intersection occurred.

Intersections Between Secondary Rays and Light Source (Otherwise)

It will be appreciated that that in some embodiments, there are no intersections. Such an embodiment for example could be the sky which some traditional path-tracing applications consider a light source.

The intersection determination procedure 390 is configured to extract the originating player ID from the ray payload; (ii) for every recorded encountered player ID on the ray payload, locate the cell on the visibility matrix corresponding to the current originating player ID and the recorded encountered player's ID; and (iii) set the bit corresponding to the current frame inside the cell to 1 (register dependent visibility of encountered player).

At this point the visibility matrix for the current frame is deemed to be in a completely determined state.

The visibility determination procedure 310 thus outputs the visibility matrix. The visibility matrix is used by the game server 250 to filter data packets transmitted to each client device 212, 214, 216 to prevent wall hacking.

Method Description

Figure 14:
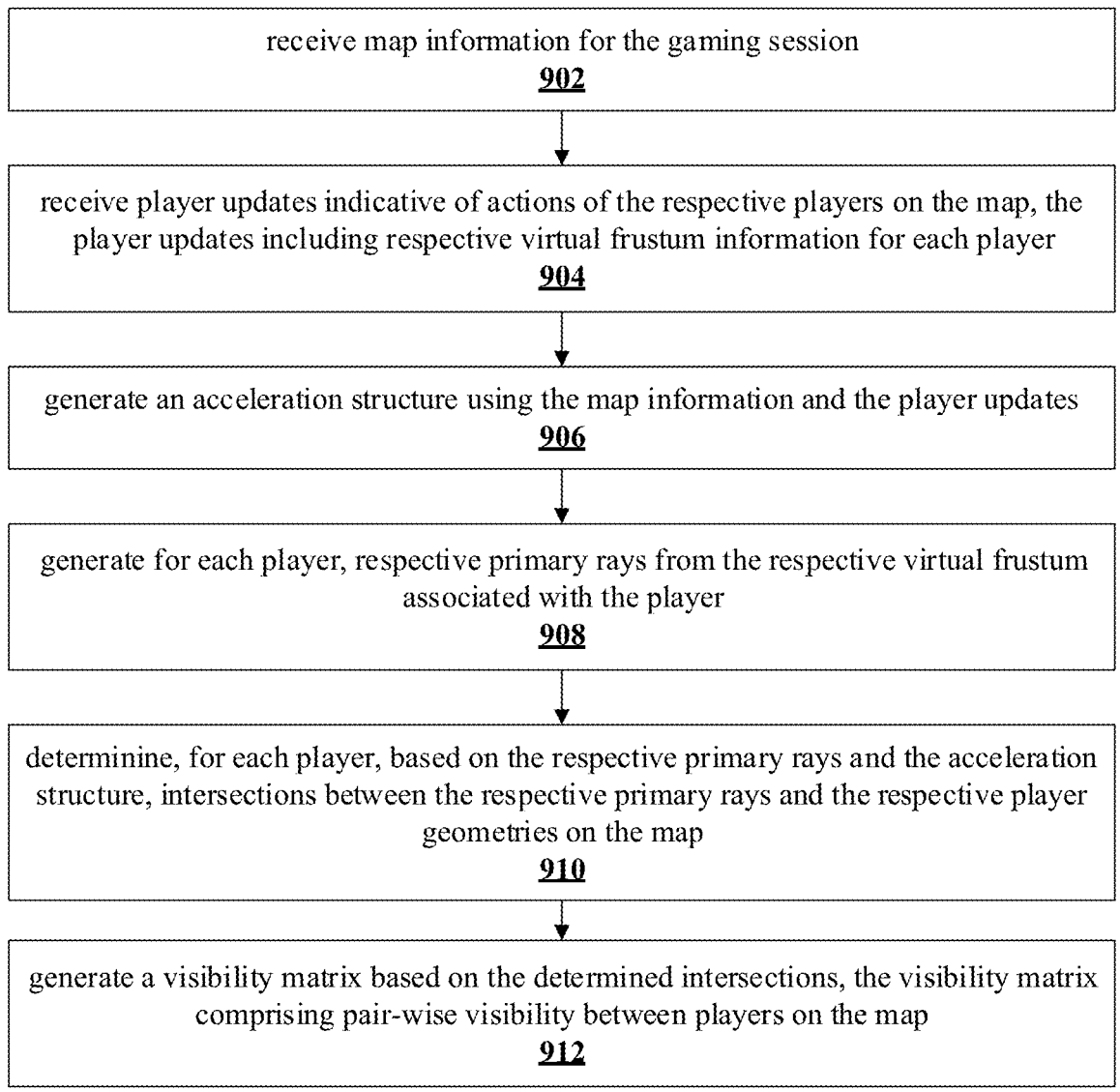
FIG. 14 depicts a flowchart of a data filtering method for preventing wall hacking in video games in accordance with one or more non-limiting embodiments of the present technology.

Now turning to FIG. 14, there is depicted a flowchart of a method 900 for determining pair-wise visibility between players during a video game, the method being executable in accordance with one or more non-limiting embodiments of the present technology.

In one or more embodiments, the server 250 comprises a processing device such as the processor 110 and/or the GPU 111 operatively connected to a non-transitory computer readable storage medium such as the solid-state drive 120 and/or the random-access memory 130 storing computer-readable instructions. The processing device is operable to provide real-time ray tracing, for example, via the GPU 111. The processing device, upon executing the computer-readable instructions, is configured to or operable to execute the method 900.

In one or more other embodiments, the output of method 900 may be used for preventing wall hacking from happening by filtering outgoing data packets provided to the client devices.

According to processing step 902, the server 250 receives map information for the gaming session.

According to processing step 904, the server 250 receives player updates indicative of actions of the respective players on the map, the player updates including respective virtual frustum information for each player.

According to processing step 906, the server 250 generates an acceleration structure using the map information and the player updates.

According to processing step 908, the server 250 generates, for each player, respective primary rays from the respective virtual frustum associated with the player.

According to processing step 910, the server 250 determines, for each player, based on the respective primary rays and the acceleration structure, intersections between the respective primary rays and the respective player geometries on the map According to processing step 912, the server 250 generating a visibility matrix based on at least the determined intersections, the visibility matrix comprising pair-wise visibility between the respective players on the map.

In one or more embodiments, the visibility matrix obtained via method 900 may be used to filter outgoing data packets transmitted to each of the plurality of client devices 210. In one or more other embodiments, the visibility matrix obtained via method 900 may be used to analyze past multiplayer gaming sessions so as to perform statistical analysis.

Reference will now be made to FIG. 15 to FIG. 26, describing non-limiting embodiments of the data filtering procedure 300 in the forms of method 1000 to method 1450.

Figure 15:
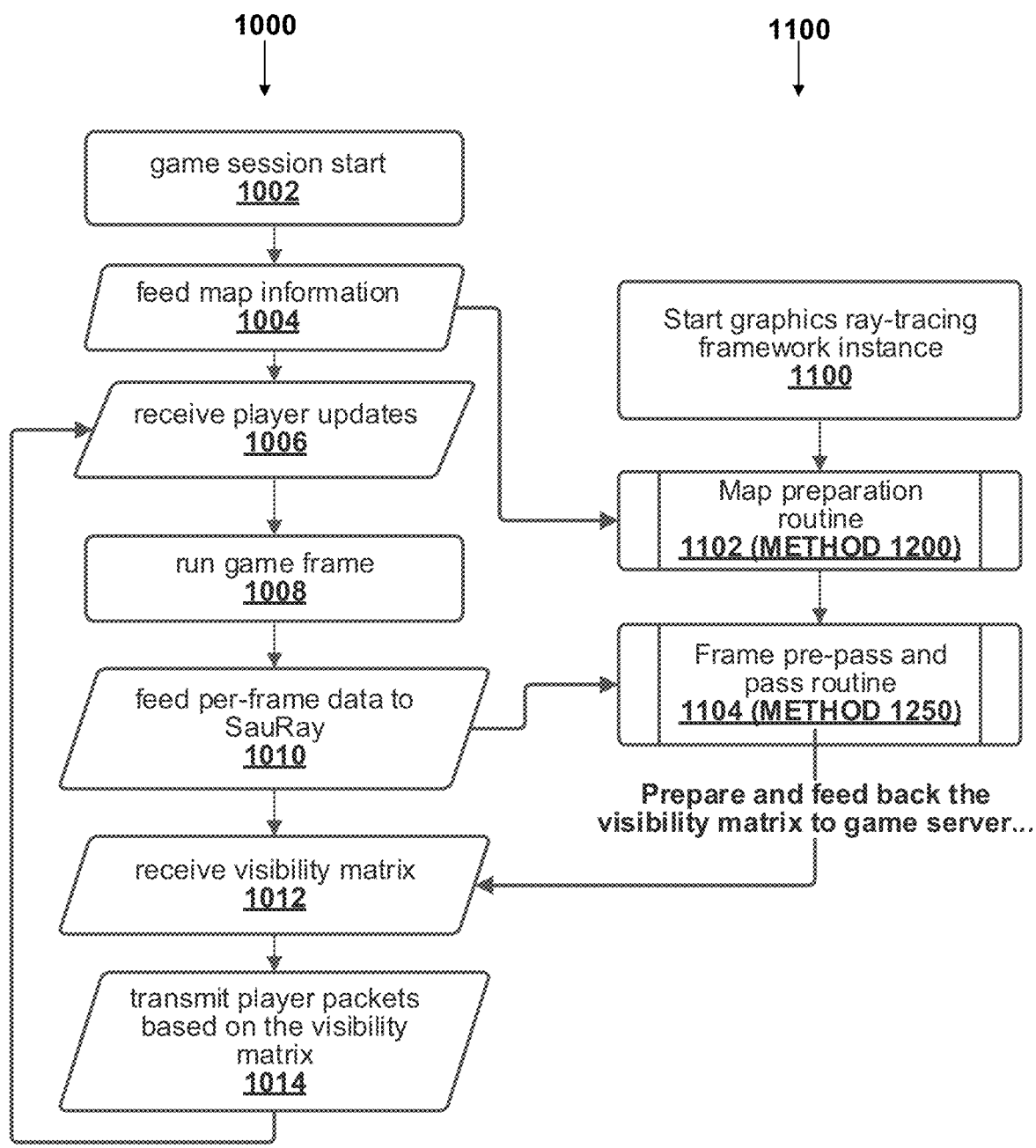
FIG. 15 depicts a flow chart of a method for executing a server gaming loop and a flow chart of a method of executing a ray tracing consumption loop in accordance with one or more non-limiting embodiments of the present technology.
Figure 16:
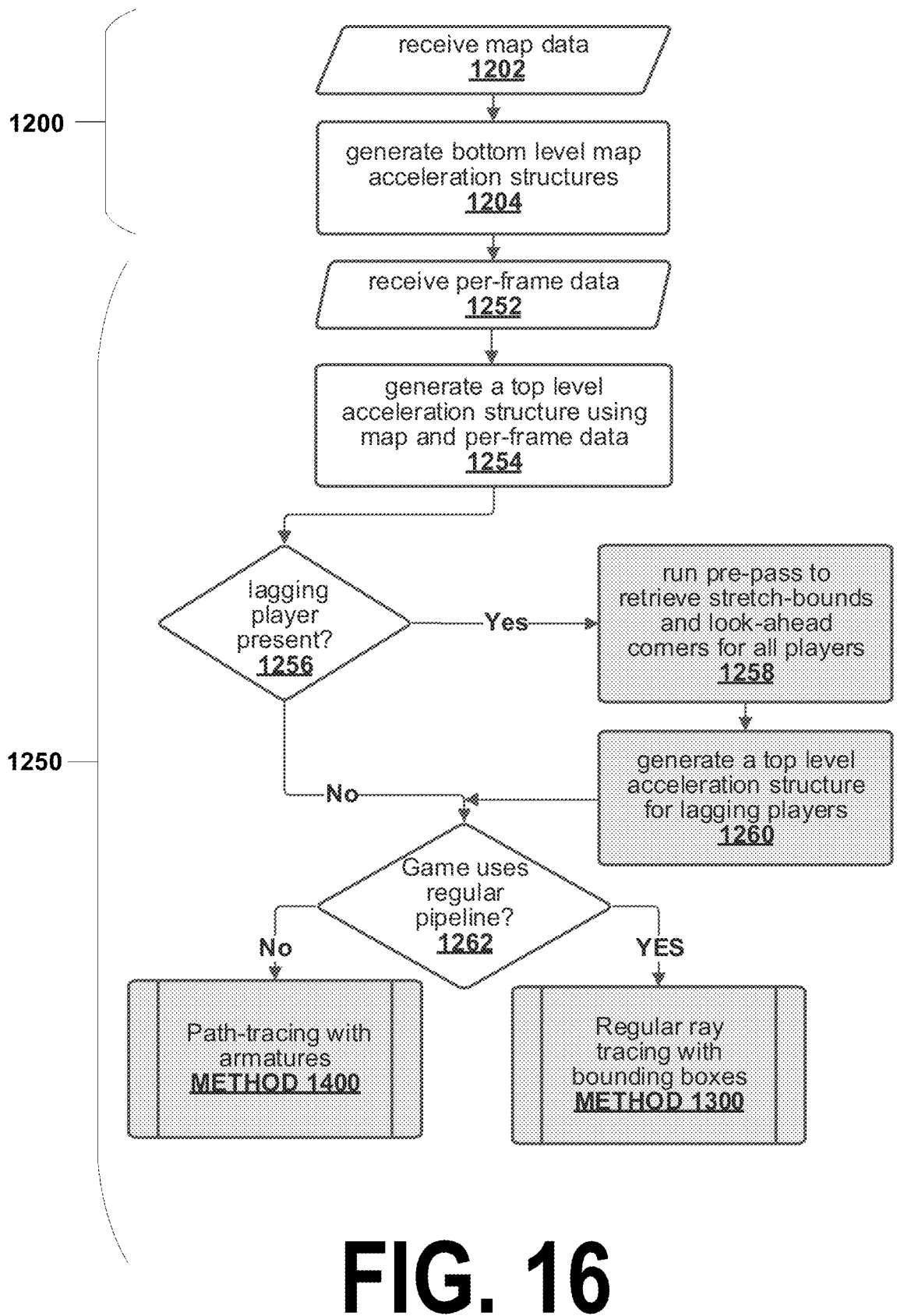
FIG. 16 depicts a flow chart of a method for preparing map work in an online gaming session and a flow chart of a method of executing frame pre-pass and pass in accordance with one or more non-limiting embodiments of the present technology.

FIG. 15 depicts a flow chart of a method for executing a server gaming loop 1000 and a flow chart of a method of executing a ray tracing consumption loop 1100 in accordance with one or more non-limiting embodiments of the present technology.

Server Loop

According to processing step 1002, the server 250 starts the online gaming session. The online gaming session begins for each of the client devices 212, 214, 216.

According to processing step 1004, the server 250 feeds map information to the consumption loop 1100. The server 250 provides map information. The consumption loop 1100 executes a map preparation method 1200.

According to processing step 1006, the server 250 receives player updates. In one or more embodiments, the server 250 receives player updates from each of the client devices 210 over the communication network 270.

According to processing step 1008, the server 250 runs a game frame.

According to processing step 1010, the server 250 feeds per-frame data to the consumption loop 1100. The consumption loop 1100 executes a frame pre-pass and pass routine 1250.

According to processing step 1012, the server 250 receives a visibility matrix determined by the consumption loop 1100.

According to processing step 1014, the server 250 transmits player packets based on the visibility matrix.

The server 250 executes processing steps 1006 to 1014 repeatedly until a stopping criterion is met, such as the end of the gaming session.

Consumption Loop

According to processing step 1100, the server 250 starts a ray tracing framework instance.

According to processing step 1102, the server 250 receives the map information from the server loop 1000 and executes a map preparation routine or method 1200.

According to processing step 1104, the server 250 receives the per-frame data from the server loop 1000 and executes the frame pre-pass and pass routine 1250 or method 1250.

Map Preparation Routine and Frame Pre-Pass and Pass Routine

Now turning to FIG. 14, the map preparation routine 1200 and the frame pre-pass and pass routine 1250 will now be described.

According to processing step 1202, the server 250 receives map data.

According to processing step 1204, the server 250 generates bottom level map acceleration structures.

According to processing step 1252, the server 250 receives per-frame data.

According to processing step 1254, the server 250 generates a top level acceleration structure using map and per-frame data.

According to processing step 1256, the server 250 determines if a lagging player is present in the online gaming session. If a lagging player is present, the server 250 proceeds to processing step 1258. If a lagging player is not present, the server 250 proceeds to processing step 1262.

According to processing step 1258, the server 250 runs pre-pass to retrieve stretch-bounds and look-ahead corners for all players.

According to processing step 1260, the server 250 generates a top level acceleration structure for lagging players. The server 250 then proceeds to step 1262.

According to processing step 1262, the server 250 determines if the game uses a regular pipeline. If the game uses a regular pipeline, the server 250 proceeds by executing a regular ray tracing method 1300 with bounding boxes. If the game does not use a regular pipeline, the server 250 proceeds by executing method 1400 to run a path-traced algorithm with armatures.

Reference is now be made to FIG. 17 to FIG. 22 for the regular ray tracing method with bounding boxes.

Regular Ray Tracing with Bounding Boxes

Figure 17:
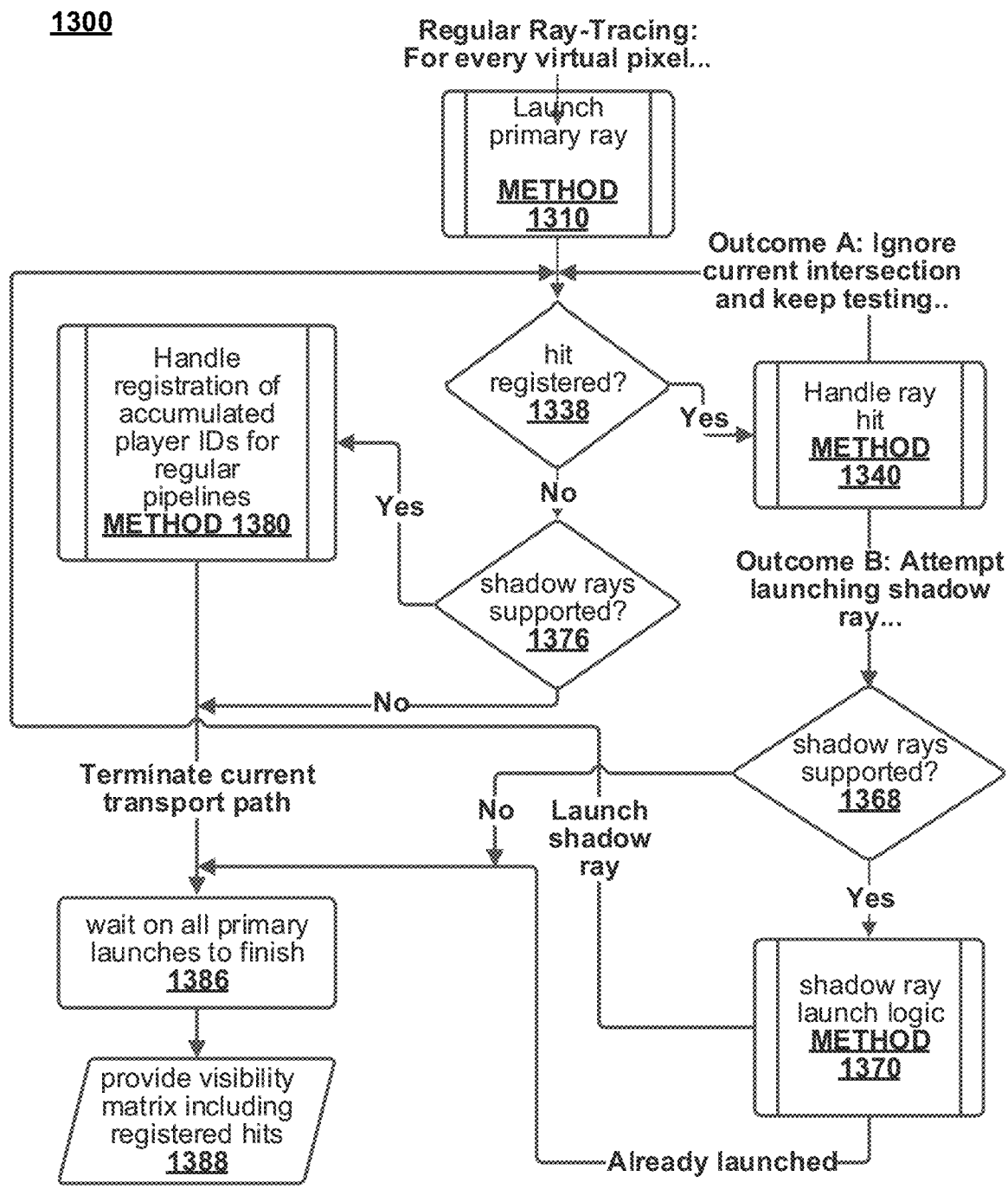
FIG. 17 depicts a flow chart of a method for generating a visibility matrix using a regular ray tracing with bounding boxes in accordance with one or more non-limiting embodiments of the present technology.

FIG. 17—Method 1300

According to processing step 1302, the server 250 launches primary rays for every virtual pixel. The server 250 launches primary rays for every virtual pixel by executing method 1310.

According to processing step 1338, the server 250 determines if a hit was registered.

If a hit was registered, the server 250 proceeds to method 1340.

If method 1340 determines that the intersection should be ignored, the server 250 proceeds to method 1338. If method 1340 determines that a shadow ray should be launched it proceeds to processing step 1368.

According to step 1368, if shadow rays are supported the server 250 proceeds to method 1370. If not, the server 250 proceeds to processing step 1386.

If method 1370 determines that the shadow ray is already launched, the server 250 proceeds to processing step 1386. Otherwise, the server 250 launches a shadow ray and proceeds to processing step 1338.

If a hit was not registered at processing step 1338, the server 250 proceeds to processing step 1376.

According to processing step 1376, the server 250 determines if shadow rays are supported.

If shadow rays are supported, the server 250 proceeds to method 1380 to handle registration of accumulated player IDS for regular pipelines.

If shadow rays are not supported, the server 250 terminates the current transport path and proceeds to processing step 1386.

According to processing step 1386, the server 250 waits on all the primary launches to finish.

According to processing step 1388, the server 250 provides the visibility matrix including registered hits from step 1388. The method 1300 ends and proceeds to processing step 1012 of the method 1000.

Primary Ray Launch for Regular Ray Tracing

Figure 18:
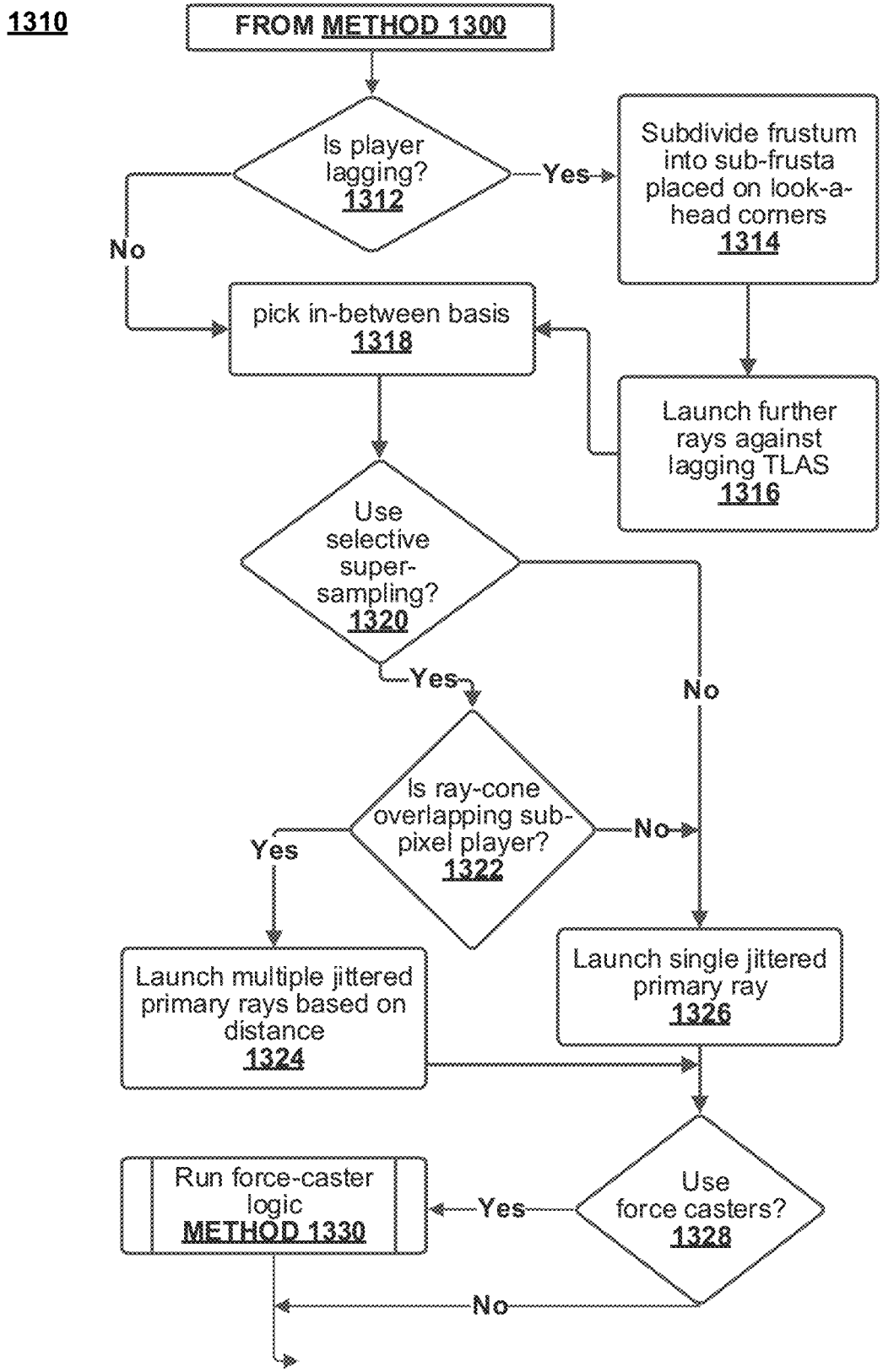
FIG. 18 depicts a flow chart of a method for launching primary rays by using regular ray tracing in accordance with one or more non-limiting embodiments of the present technology.

FIG. 18—Method 1310

According to processing step 1312, the server 250 determines if a player is lagging.

If a player is lagging, the server 250 executes processing step 1314.

According to processing step 1314, the server 250 subdivides frustum into sub-frusta placed on look-a-head corners.

According to processing step 1316, the server 250 launches further rays only against the lagging TLAS and proceeds to processing step 1318.

If the player is not lagging, the server 250 executes processing step 1318.

According to processing step 1318, the server 250 picks in-between basis.

According to processing step 1320, the server 250 determines if selective super-sampling is used.

If selective super-sampling is used, the server 250 proceeds to processing step 1322. If selective super-sampling is not used, the server 250 proceeds to processing step 1326.

According to processing step 1322, the server 250 determines if the ray-cone is overlapping sub-pixel players. If the ray-cone is overlapping sub-pixel players the server 250 proceeds to processing step 1324. If the ray-cone is not overlapping sub-pixel players, the server 250 proceeds to processing step 1326.

According to processing step 1324, in response to the ray-cone overlapping sub-pixel players, the server 250 launches multiple jittered primary rays based on distance. It then proceeds to processing step 1328.

According to processing step 1326, in response to the ray-cone not overlapping sub-pixel players, the server 250 launches single jittered primary ray. It then proceeds to processing step 1328.

According to processing step 1328, the server 250 determines if force casters should be used.

If it is determined that force casters should be used, the server 250 proceeds to execute method 1330 for running force-caster logic.

If it is determined that force casters should not be used, the server 250 proceeeds to execute processing step 1338 of method 1300.

Handle Force-Caster Logic

Figure 19:
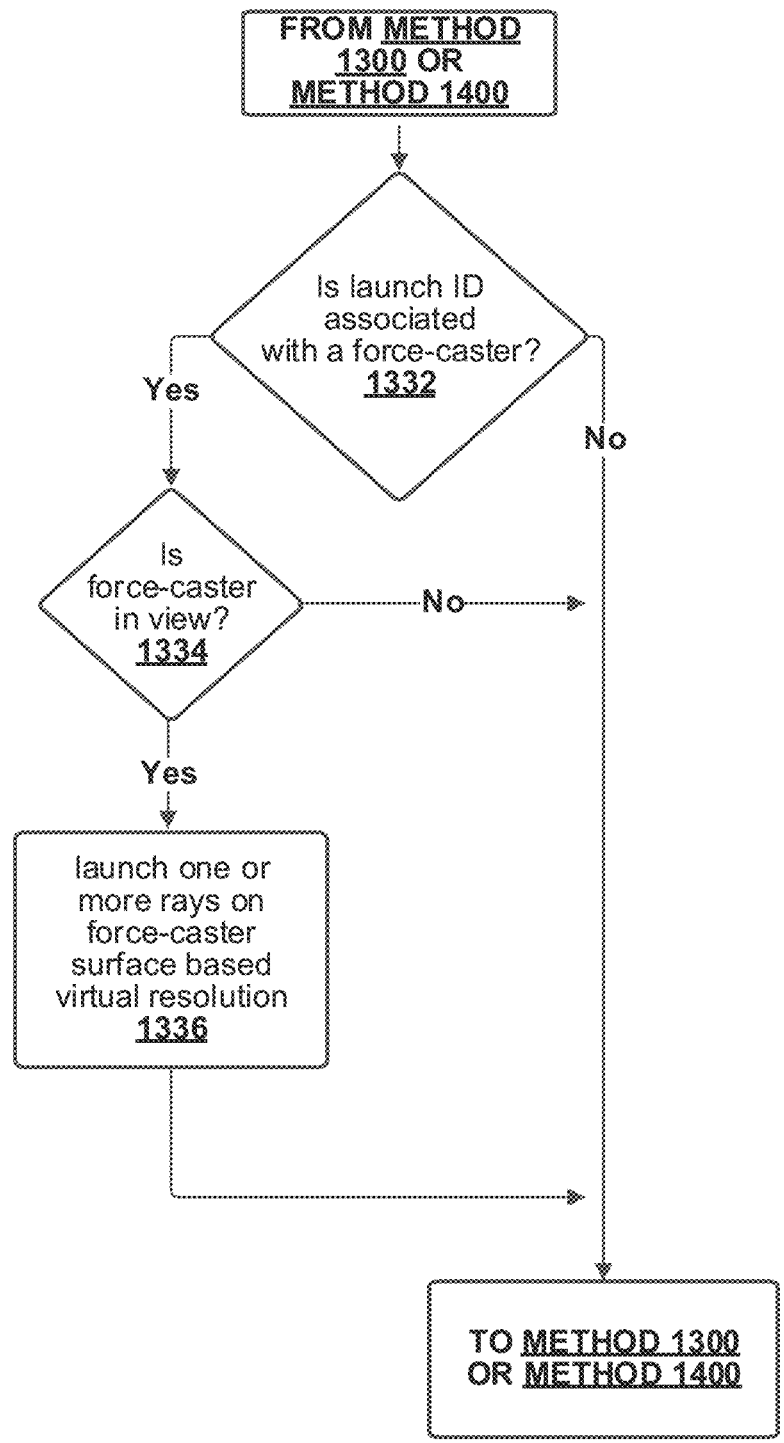
FIG. 19 depicts a flow chart of a method for launching rays on force-casters in either of regular ray tracing or path-tracing approaches in accordance with one or more non-limiting embodiments of the present technology.

FIG. 19—Method 1330

According to processing step 1332, the server 250 determines if a launch ID is associated with a force-caster.

If a launch ID is associated with a force-caster, the server 250 proceeds to processing step 1334.

If a launch ID is not associated with a force-caster, the server 250 proceeds to execute processing step 1338 of method 1300 if launched from method 1300 or step 1402 of method 1400 if launched from method 1400.

According to processing step 1334, the server 250 determines if a force-caster is in view.

If the server 250 determines that the force-caster is not in view, the server 250 proceeds to execute processing step 1338 of method 1300 if launched from method 1300 or step 1402 of method 1400 if launched from method 1400.

If the server 250 determines that the force-caster is in view, the server 250 proceeds tp execute processing step 1336.

According to processing step 1336, the server 250 launches one or more rays on force-caster surface based on virtual resolution.

The method 1330 ends and the server 250 proceeds to execute processing step 1338 of method 1300 if launched from method 1300 or step 1402 of method 1400 if launched from method 1400.

Handle Ray Hits for Regular Ray Tracing

Figure 20:
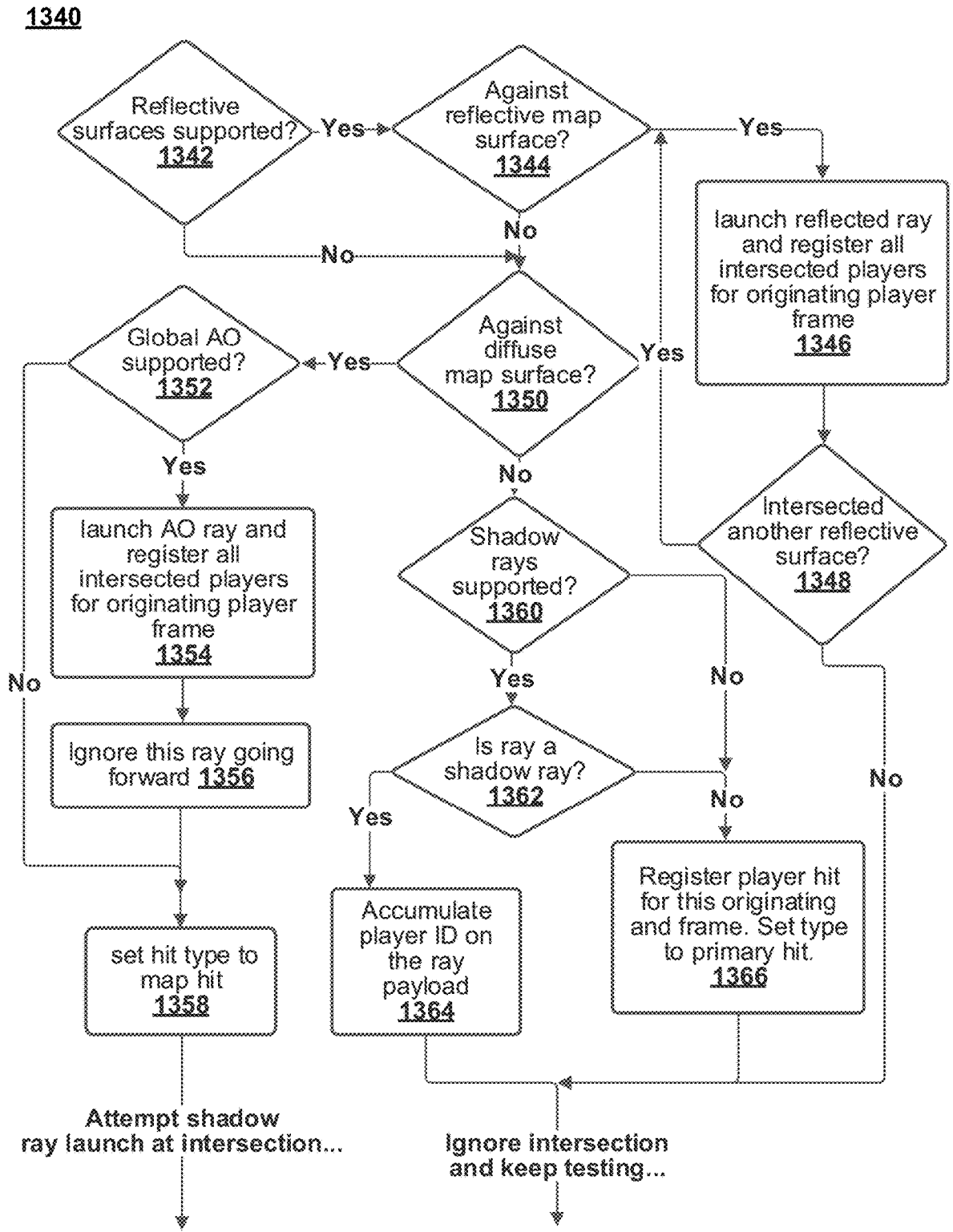
FIG. 20 depicts a flow chart of a method of handling ray hits by using the regular ray tracing approach with bounding boxes in accordance with one or more non-limiting embodiments of the present technology.

FIG. 20—Method 1340

According to processing step 1342, the server 250 determines if reflective surfaces are supported.

If reflective surfaces are supported, the server 250 proceeds to execute processing step 1344. If reflective surfaces are not supported, the server 250 proceeds to execute processing step 1350.

According to processing step 1344, the server 250 determines if the intersection is against a reflective map surface.

If it is against a reflective map surface, the server 250 executes processing step 1346. If it is not against a reflective map surface, the server 250 proceeds to execute processing step 1350.

According to processing step 1346, the server 250 launches reflected ray and registers all intersected players for originating player frame. It then proceeds to processing step 1348.

According to processing step 1348, the server 250 determines if it intersected another reflective surface. If it did not intersect another reflective surface, the server 250 proceeeds to processing step 1338. If it did intersect another reflective surface the server 250 proceeds to processing step 1346.

According to processing step 1350, the server 250 determines if it intersected against a diffuse a map surface. If it intersected against a diffuse map surface, the server 250 executes processing step 1352. If it did not insersect against a diffuse map surface, the server 250 proceeds to execute step 1360.

According to processing step 1352, the server 250 determines if global AO is supported. If global AO is not supported, the server 250 proceeds to execute processing step 1358.

If global AO is supported, the server 250 proceeds to execute processing step 1354.

According to processing step 1354, the server 250 launches AO ray and registers all intersected players for originating player frame. It then proceeds to processing step 1356.

According to processing step 1356, the server 250 ignores this ray going forward. It then proceeds to processing step 1356.

According to processing step 1358, the server 250 sets hit type to map hit. The server 250 then attemps shadow ray launch at intersection.

According to processing step 1360, if it did not insersect against a diffuse map surface, the server 250 determines if shadow rays are supported. If shadow rays are supported it proceeds to processing step 1362. Otherwise it proceeds to processing step 1366.

According to processing step 1362, the server 250 determines if the ray is a shadow ray. If the ray is a shadow ray the server 250 proceeds to execute processing step 1364. If the ray is not a shadow ray the server 250 proceeds to execute processing step 1366.

According to processing step 1364, if the ray is a shadow ray, the server 250 accumulates player ID on the ray payload.

According to processing step 1366, if the ray is not a shadow ray, the server 250 registers player hit for this originating and frame. and sets type to primary hit.

After processing steps 1364 and/or 1366, the server 250 proceeds to processing step 1338.

Shadow Rays for Regular Ray Tracing

Figure 21:
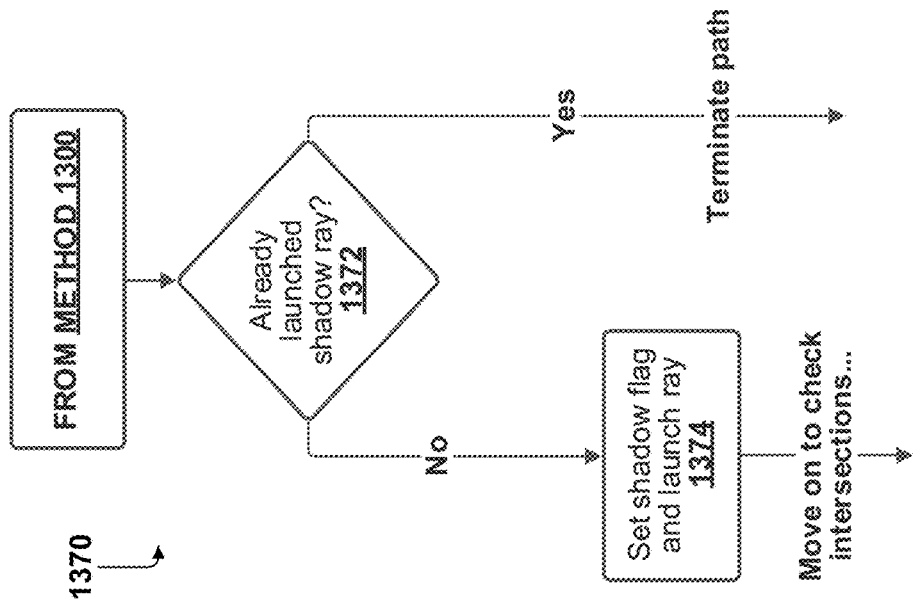
FIG. 21 depicts a flow chart of a method for launching shadow rays by using the regular ray tracing approach with bounding boxes in accordance with one or more non-limiting embodiments of the present technology.

FIG. 21—Method 1370

According to processing step 1372, the server 250 determines if a shadow was already launched. If a shadow ray was already launched, the server 250 proceeds to processing step 1386. If a shadow ray was not already launched, the server 250 proceeds to processing step 1374.

According to processing step 1374, the server 250 sets the shadow flag and launches the ray. The server 250 then proceeds to processing step 1338.

Figure 22:
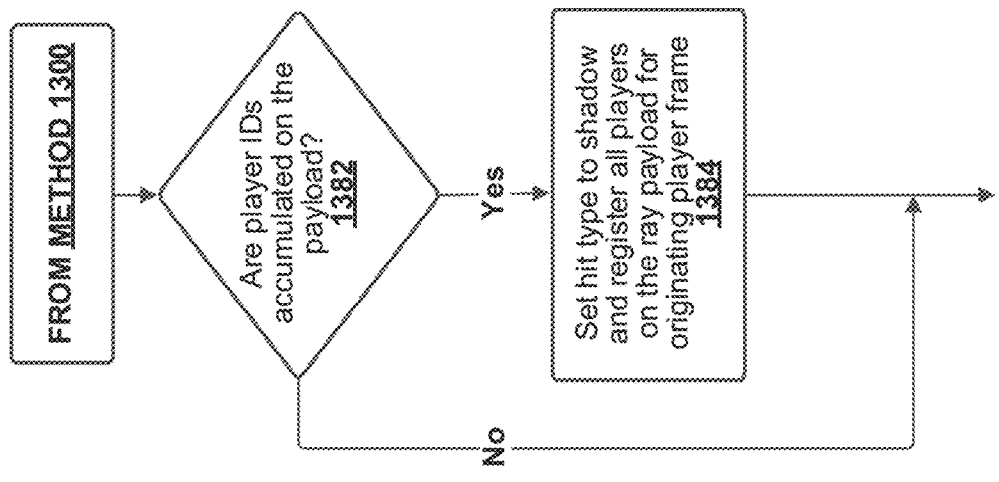
FIG. 22 depicts a flow chart of a method for handling registration of accumulated player IDs by using the regular approach with bounding boxes in accordance with one or more non-limiting embodiments of the present technology.

Handle registration of accumulated players for regular ray tracing:

FIG. 22—Method 1380

According to processing step 1382, the server 250 determines if the player IDs are accumulated on the payload. If the player IDs are accumulated on the payload, the server 250 proceeds to execute processing step 1384. If the player IDs are not accumulated on the payload, the server 250 proceeds to processing step 1386 of method 1300.

According to processing step 1384, the server 250 sets the hit type to shadow and registers all players on the ray payload for originating player frame. It then proceeds to processing step 1386 of method 1300.

Reference is now be made to FIG. 23 to FIG. 26 for the path traced procedure with armatures.

Path-Tracing with Armatures

Figure 23:
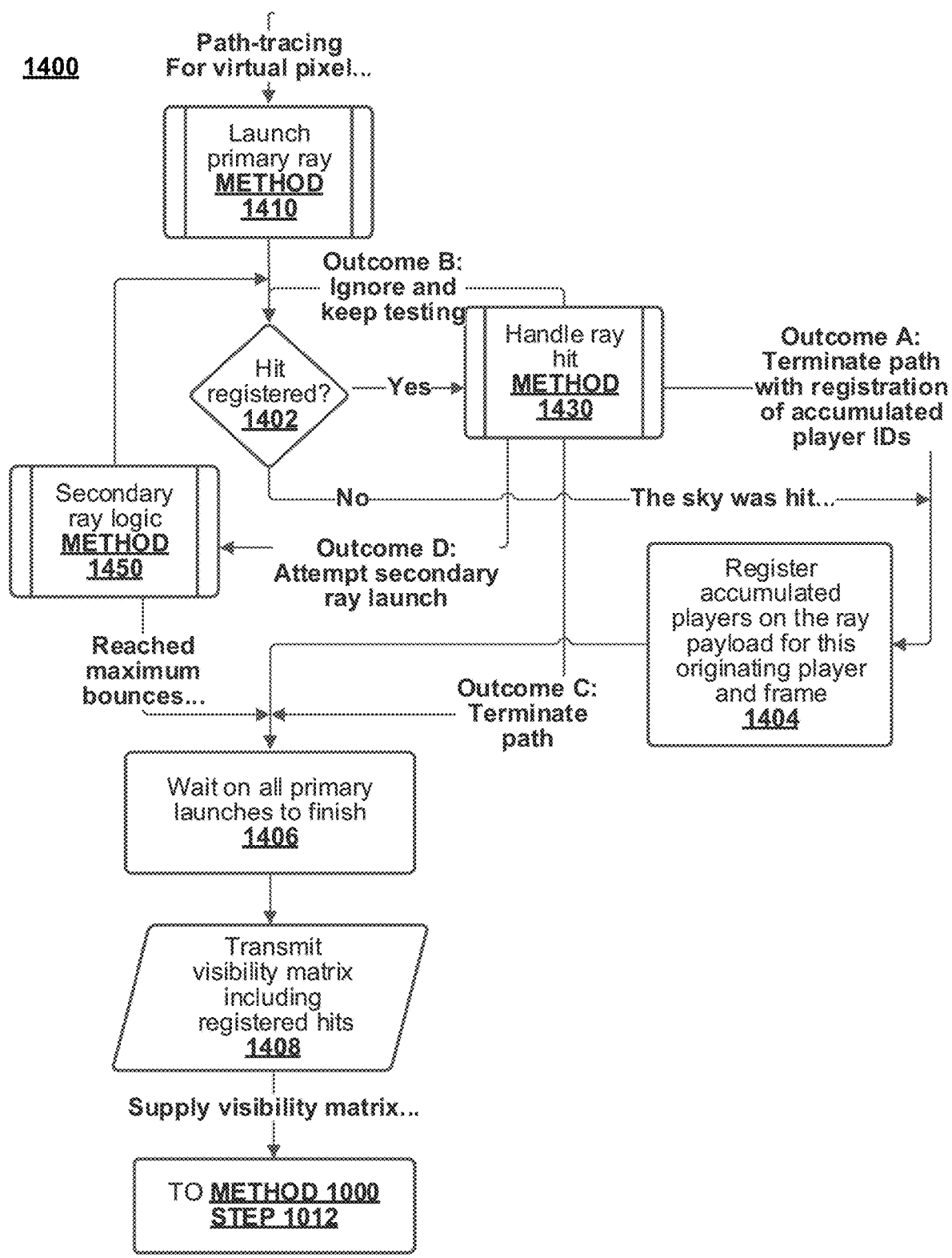
FIG. 23 depicts a flow chart of a method for generating a visibility matrix by using path tracing with armatures in accordance with one or more non-limiting embodiments of the present technology.

FIG. 23—Method 1400

According to processing step 1401, the server 250 launches a primary ray by executing method 1410. It then proceeds to processing step 1402.

According to processing step 1402, the server 250 determines if a ray intersection was detected.

If a ray intersection was detected, the server 250 handles the ray hit by executing method 1430.

If a ray intersection was not detected, the ray hit the sky. The server 250 proceeds to processing step 1404.

If method 1430 exits with outcome A, it has determined that the ray has to be terminated and that it also has accumulated player IDs that require visibility registration. The server 250 proceeds to processing step 1404 to register all dependent visibility.

If method 1430 exits with outcome B, the ray hit has been ignored. The server 250 proceeds to processing processing step 1402 as if the intersection has not happened.

If method 1430 exits with outcome C, the whole ray path is to be terminated. The server 250 proceeds to processing step 1406.

If method 1430 exits with outcome D the server 250 attempts to launch secondary rays. It proceeds to processing step 1450 to handle secondary ray logic.

If method 1450 determines that maximum bounces have been reached the server 250 proceeds to processing step 1406.

Otherwise it has launched a secondary ray and it proceeds to processing this ray via step 1402.

According to processing step 1404, the server 250 registers accumulated players on the ray payload for this originating player and frame. It then proceeds to processing step 1406.

According to processing step 1406, the server 250 waits on all primary launches to finish. It then proceeds to processing step 1408.

According to processing step 1408, the server 250 transmits visibility matrix including registered hits.

Primary Rays for Path-Tracing with Armatures

Figure 24:
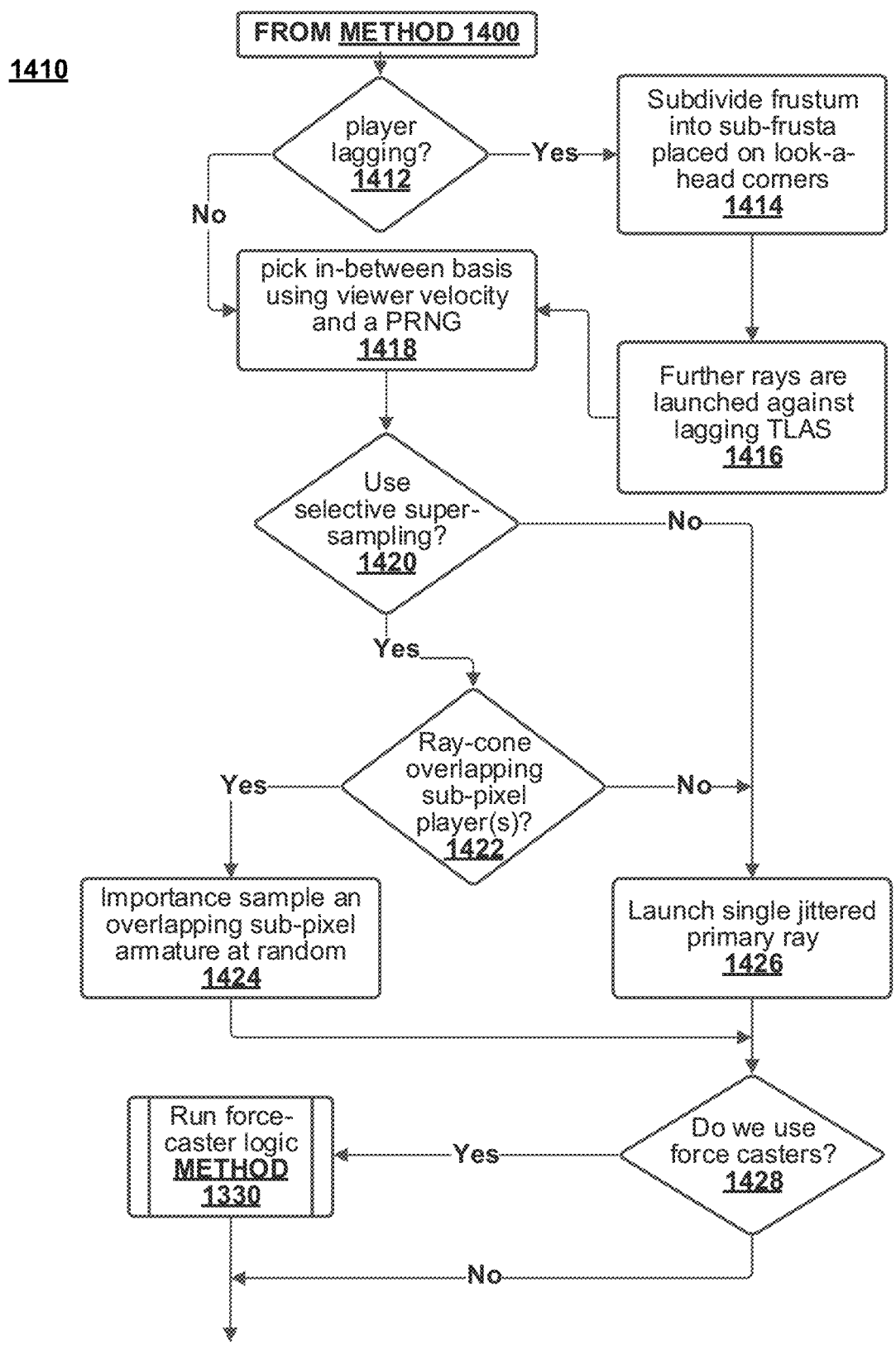
FIG. 24 depicts a flow chart of a method of launching primary rays by using path tracing with armatures in accordance with one or more non-limiting embodiments of the present technology.

FIG. 24—Method 1410

According to processing step 1412, the server 250 determines if the player is lagging. If the player is lagging, the server 250 proceeds to execute processing step 1414. If the player is not lagging, the server 250 proceeds to execute processing step 1418.

According to processing step 1414, the server 250 subdivides the frustum into sub-frusta placed on look-a-head corners. It then proceeds to processing step 1416.

According to processing step 1416, the server 250 launches further all rays against the lagging TLAS. It then proceeds to processing step 1418.

According to processing step 1418, the server 250 picks an in-between basis using viewer velocity and a PRNG. It then proceeds to processing step 1420.

According to processing step 1420, the server 250 determines if selective super sampling is used.

If selective super sampling is used, the server 250 proceeds to execute processing step 1422.

If selective super sampling is not used, the server 250 proceeds to execute processing step 1426.

According to processing step 1422, the server 250 determines if the ray-cone overlaps sub-pixel player(s). If the ray-cone overlaps sub-pixel player(s), the server 250 proceeds to execute processing step 1424. If the ray-cone does not overlap sub-pixel player(s), the server 250 proceeds to execute processing step 1426.

According to processing step 1424, the server 250 selects from the sub-pixel armatures overlapping this ray cone, an armature to redirect the ray towards. This corresponds to the importance sampling procedure 370.

According to processing step 1426, the server 250 launches single jittered primary ray.

According to processing step 1428, the server 250 determines if force casters should be used. If force casters should be used, the server 250 proceeds to execute method 1330 to run force-caster logic. If force casters should not be used, the server 250 proceeds to execute step 1402 from of method 1400.

Handling Ray Hits for Path-Tracing with Armatures

Figure 25:
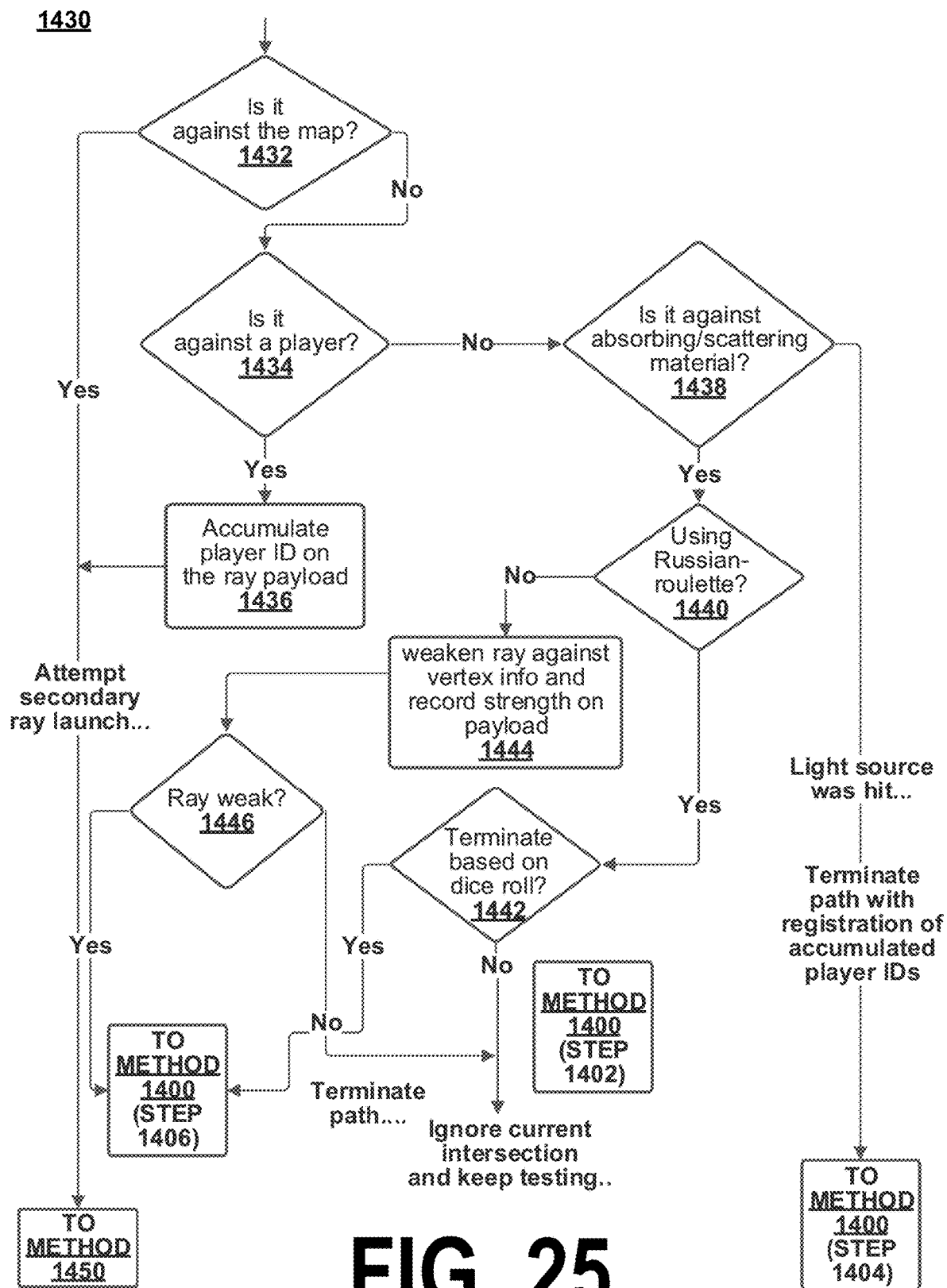
FIG. 25 depicts a flow chart of a method of handling ray hits by using path tracing with armatures in accordance with one or more non-limiting embodiments of the present technology.

FIG. 25—Method 1430

According to processing step 1432, the server 250 determines if the ray intersection is against the map. If the ray has intersected the map, the server 250 proceeds to attempt a secondary ray launch by executing method 1450. If there is no ray hit against the map, the server 250 proceeds to execute processing step 1434.

According to processing step 1434, the server 250 determines if the ray intersection is against a player. If the ray intersection is against a player, the server 250 proceeds to execute processing step 1436. If the ray intersection is not against a player, the server 250 proceeds to execute processing step 1438.

According to processing step 1436, the server 250 accumulates player ID on the ray payload. The server 250 then proceeds to attempt a secondary ray launch by executing method 1450.

According to processing step 1438, the server 250 determines if the ray intersection is against absorbing/scattering material. If the ray intersection is against absorbing/scattering material, the server 250 proceeds to execute processing step 1440.

If the ray hit is not against absorbing/scattering material, a light source was hit and the server 250 terminates the path with registration of accumulated player IDs and proceeds to execute processing step 1404 of method 1400.

According to processing step 1440, the server 250 determines if russian-roulette is used. If russian-roulette is used, the server 250 proceeds to execute processing step 1442. If russian-roulette is not used, the server 250 proceeds to execute processing step 1444.

According to processing step 1442, the server 250 determines if the ray should be terminated based on a dice roll. If the ray should be terminated based on a dice roll, the server 250 terminates the path and proceeds to execute processing step 1406 of method 1400.

If the ray should not be terminated based on a dice roll, the server 250 ignores the current intersection and proceeds to processing step 1402 of method 1400.

According to processing step 1444, the server 250 weakens the ray against vertex info and records the strength on the payload. It then proceeds to process step 1446.

According to processing step 1446, the server 250 determines if the ray is weak. In one or more embodiments, the server 250 determines if the ray is weak by comparing the ray strength to a threshold.

If the ray is determined to be weak, the server 250 terminates the path and proceeds to execute processing step 1406 of method 1400.

If the ray is determined not to be weak, the server 250 ignores the current intersection and keeps proceeds to processing step 1402 of method 1400.

Next Event Estimation Handling for Path-Tracing with Armatures

Figure 26:
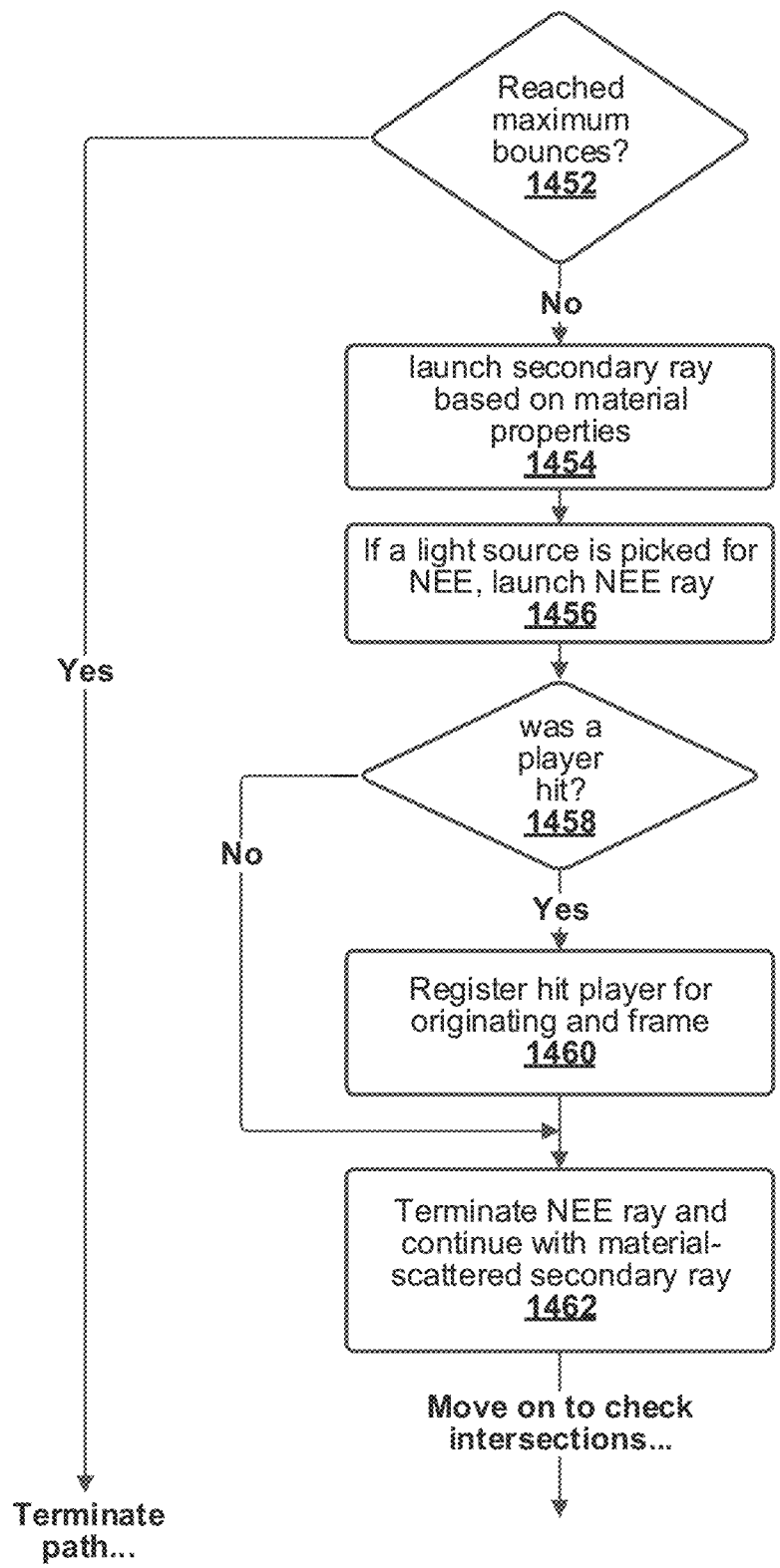
FIG. 26 depicts a flow chart of a method of lauching secondary rays by using path tracing with armatures in accordance with one or more non-limiting embodiments of the present technology.

FIG. 26—Method 1450

According to processing step 1452, the server 250 determines if the ray has reached the maximum number of bounces. If the ray reached the maximum number of bounces, the server 250 terminates the path and proceeds to execute processing step 1406 of method 1400. If the ray has not reached the maximum number of bounces, the server 250 proceeds to execute processing step 1454.

According to processing step 1454, the server 250 launches the secondary ray based on material properties According to processing step 1456, the server 250 launches a NEE ray if a light source is picked for NEE, According to processing step 1458, the server 250 determines if a player was hit. If a player was hit, it proceeds to processing step 1460. Otherwise, it proceeds to processing step 1462.

According to processing step 1460, the server 250 registers hit player for originating and frame. It then proceeds to processing step 1462.

According to processing step 1462, the server 250 terminates NEE ray and continues with material-scattered secondary ray. The server 250 proceeds to processing step 1402 of method 1400.

It should be apparent to those skilled in the art that at least some embodiments of the present technology aim to expand a range of technical solutions for addressing a particular technical problem, namely preventing wall hacking from happening in multiplayer video games by using server side ray tracing, which may save bandwidth and computational resources by only transmitting required client update data to client devices.

It should be expressly understood that not all technical effects mentioned herein need to be enjoyed in each and every embodiment of the present technology. For example, embodiments of the present technology may be implemented without the user enjoying some of these technical effects, while other non-limiting embodiments may be implemented with the user enjoying other technical effects or none at all.

Some of these steps and signal sending-receiving are well known in the art and, as such, have been omitted in certain portions of this description for the sake of simplicity. The signals can be sent-received using optical means (such as a fiber-optic connection), electronic means (such as using wired or wireless connection), and mechanical means (such as pressure-based, temperature based or any other suitable physical parameter based).

Modifications and improvements to the above-described implementations of the present technology may become apparent to those skilled in the art. The foregoing description is intended to be exemplary rather than limiting.

What is claimed is:

1. A method for preventing wall hacking by using ray tracing to filter data packets to be provided to a plurality of user devices during a video gaming session, each respective user device being associated with a respective player having a respective player geometry in the gaming session, the method being executed by at least one processing device, the at least one processing device being connected to the plurality of user devices, the method comprising:
   receiving map information for the gaming session;
   for a given iteration of a plurality of iterations during the gaming session:
   receiving player updates indicative of actions of the respective players on the map, the player updates including respective virtual frustum information for each player;
   generating an acceleration structure using the map information and the player updates;
   generating, for each player, respective primary rays from the respective virtual frustum associated with the player;
   determining, for each player, based on the respective primary rays and the acceleration structure, intersections between the respective primary rays and the respective player geometries on the map;
   generating a visibility matrix based on at least the determined intersections, the visibility matrix comprising pair-wise visibility between the respective players on the map;
   receiving outgoing data packets representative of player states on the map for the given iteration;
   filtering the outgoing data packets based on the visibility matrix to obtain respective filtered data packets for each player; and
   transmitting the respective filtered data packets to each of the plurality of user devices.

2. The method of claim 1, wherein said generating the acceleration structure comprises:
   generating a plurality of bottom-level acceleration structures based on map geometry instances in the map information and the respective player geometry; and
   combining the plurality of bottom-level acceleration structures to obtain a top-level acceleration structure to be used for determining intersection between the respective primary rays and the respective player geometries on the map.

3. The method of claim 1,
   wherein said method further comprises, prior to said generating, the acceleration structure using the map information and the player updates:
   receiving current vantage point data;
   receiving future vantage point data; and
   generating, for each player, using the current vantage point data and future vantage point data, a collated player geometry associated with the respective player; and wherein
   said generating the acceleration structure comprises further using collated player geometry.

4. The method of claim 1,
   receiving current vantage point data;
   receiving future vantage point data; and
   generate, for each of the respective virtual frustum associated with the player, a respective plurality of virtual frusta using the current vantage point data and future vantage point data from which the respective primary rays are launched.

5. The method of claim 1,
   receiving a set of force-casters and associated bounding spheres;
   determining if a given force-caster of the set of force-casters overlaps with a given primary ray; and
   in response to the given force-caster of the set of force-casters overlapping with the primary ray:
   launching further primary rays.

6. The method of claim 1,
   wherein said method further comprises, prior to generating said visibility matrix:
   determining intersections between the respective rays and players on the map;
   involving a given light source;
   storing an indication of players having intersected rays having reached the given light source in association with the respective player having launched the primary rays; and
   wherein said generating the visibility matrix comprises using the stored indications of players.

7. The method of claim 3, further comprising, prior to said generating the visibility matrix:
   receiving a respective ping associated with each player;
   in response to the ping associated with at least one given player being above a predetermined threshold:
   determining respective origins for each of a plurality of virtual sub-frusta obtained for the respective virtual frustum for each respective player;
   clipping the respective origins against the map;
   determining respective threshold distances from a center of a geometry of each respective player, the respective threshold distances being proportional to the geometry of the respective player;
   generating, based on the respective threshold distances, at least one bottom level acceleration structure for each respective player; and
   generating, using the generated bottom level acceleration structures, a top level acceleration structure for the at least one given player, the top level acceleration structure to be used for determining intersecting primary rays of the at least one given player originating from at least the respective clipped origins.

8. The method of claim 6,
   wherein said player geometries comprise player armatures;
   wherein said generating, for each player, respective primary rays from the respective virtual frustum associated with the player comprises:
   determining respective difference vectors between each originating player and a centroid of each remaining player armature;
   determining if lengths of the respective difference vectors are above a predetermined threshold, the predetermined threshold being based on the respective player armature;
   determining, for the respective difference vector lengths with lengths above the threshold, an angle based on the respective difference vectors and the respective primary rays; and in response to the angle being below a threshold, redirect the primary rays towards the player armatures to be used for determining further intersections for generating the visibility matrix.

9. The method of claim 6,
wherein said player geometries comprise bounding boxes; and
wherein said generating, for each player, respective primary rays from the respective virtual frustum associated with the player comprises:
determining respective difference vectors between each originating player and a centroid of each remaining player bounding box;
determining if lengths of the respective difference vectors are above a predetermined threshold, the predetermined threshold being based on respective the bounding box;
determining, for respective difference vectors with lengths above the threshold, an angle based on the respective difference vectors and the respective primary rays; and
in response to the angle being below a threshold, launch further primary rays to be used for determining further intersections for generating the visibility matrix.

10. A method for determining pair-wise visibility between players during a video game session by using ray-tracing, each player having a respective player geometry, the method being executed by at least one processing device, the method comprising:
receiving map information for the gaming session;
for a given iteration of a plurality of iterations during the gaming session:
receiving player updates indicative of actions of the respective players on the map, the player updates including respective virtual frustum information for each player;
generating an acceleration structure using the map information and the player updates;
generating, for each player, respective primary rays from the respective virtual frustum associated with the player;
determining, for each player, based on the respective primary rays and the acceleration structure, intersections between the respective primary rays and the respective player geometries on the map; and
generating a visibility matrix based on at least the determined intersections, the visibility matrix comprising pair-wise visibility between the respective players on the map.

11. A system for preventing wall hacking by using ray tracing to filter data packets to be provided to a plurality of user devices connected to the system during a video gaming session, each respective user device being associated with a respective player having a respective player geometry, the system comprising:
a non-transitory storage medium comprising computer-readable instructions; and
at least one processing device operatively connected to the non-transitory storage medium;
the at least one processing device, upon executing the computer-readable instructions, being configured for:
receiving map information for the gaming session;
for a given iteration of a plurality of iterations during the gaming session:
receiving player updates indicative of actions of the respective players on the map, the player updates including respective virtual frustum information for each player;
generating an acceleration structure using the map information and the player updates;
generating, for each player, respective primary rays from the respective virtual frustum associated with the player;
determining, for each player, based on the respective primary rays and the acceleration structure, intersections between the respective primary rays and the respective player geometries on the map;
generating a visibility matrix based on at least the determined intersections, the visibility matrix comprising pair-wise visibility between the respective players on the map;
receiving outgoing data packets representative of player states on the map for the given iteration;
filtering the outgoing data packets based on the visibility matrix to obtain respective filtered data packets for each player; and
transmitting the respective filtered data packets to each of the plurality of user devices.

12. The system of claim 11, wherein said generating the acceleration structure comprises:
generating a plurality of bottom-level acceleration structures based on map geometry instances in the map information and the respective player geometry; and
combining the plurality of bottom-level acceleration structures to obtain a top-level acceleration structure to be used for determining intersection between the respective primary rays and the respective player geometries on the map.

13. The system of claim 11,
wherein said at least one processing device is further configured for, prior to said generating the acceleration structure using the map information and the player updates:
receiving current vantage point data;
receiving future vantage point data;
generating, for each player, using the current vantage point data and future vantage point data, a collated player geometry associated with the respective player; and wherein
said generating the acceleration structure comprises further using collated player geometry.

14. The system of claim 11,
receiving current vantage point data;
receiving future vantage point data; and
generate, for each of the respective virtual frustum associated with the player, a respective plurality of virtual frusta using the current vantage point data and future vantage point data from which the respective primary rays are launched.

15. The system of claim 11,
receiving a set of force-casters and associated bounding spheres;
determining if a given force-caster of the set of force-casters overlaps with a given primary ray
in response to the given force-caster of the set of force-casters overlapping with the primary ray:
launching further primary rays.

16. The system of claim 11,
wherein said at least one processing device is further configured for, prior to generating said visibility matrix:
determining intersections between the respective rays and players on the map;
involving a given light source;

storing an indication of players having intersected rays having reached the given light source in association with the respective player having launched the primary rays; and wherein said generating the visibility matrix comprises using the stored indications of players.

17. The system of claim 12, further comprising, prior to said generating the visibility matrix:

receiving a respective ping associated with each player;

in response to the ping associated with at least one given player being above a predetermined threshold:

determining respective origins for each of a plurality of virtual sub-frusta obtained for the respective virtual frustum for each respective player;

clipping the respective origins against the map;

determining respective threshold distances from a center of a geometry of each respective player, the respective threshold distances being proportional to the geometry of the respective player;

generating, based on the respective threshold distances, at least one bottom level acceleration structure for each respective player; and generating, using the generated bottom level acceleration structures, a top-level acceleration structure for the at least one given player, the top-level acceleration structure to be used for determining intersecting primary rays of the at least one given player originating from at least the respective clipped origins.

18. The system of claim 16, wherein said player geometries comprise player armatures;

wherein said generating, for each player, respective primary rays from the respective virtual frustum associated with the player comprises:

determining respective difference vectors between each originating player and a centroid of each remaining player armature;

determining if lengths of the respective difference vectors are above a predetermined threshold, the predetermined threshold being based on the respective player armature;

determining, for the respective difference vector lengths with lengths above the threshold, an angle based on the respective difference vectors and the respective primary rays; and in response to the angle being below a threshold, redirect the primary rays towards the player armatures to be used for determining further intersections for generating the visibility matrix.

19. The system of claim 18, wherein said player geometries comprise bounding boxes; and wherein said generating, for each player, respective primary rays from the respective virtual frustum associated with the player comprises:

determining respective difference vectors between each originating player and a centroid of each remaining player bounding box;

determining if lengths of the respective difference vectors are above a predetermined threshold, the predetermined threshold being based on respective the bounding box;

determining, for respective difference vectors with lengths above the threshold, an angle based on the respective difference vectors and the respective primary rays; and in response to the angle being below a threshold, launch further primary rays to be used for determining further intersections for generating the visibility matrix.

20. The system of claim 11, wherein said at least one processing device comprises a graphics processing unit (GPU).

* * * * *